US007165477B2

(12) United States Patent
Lyne, Jr.

(10) Patent No.: US 7,165,477 B2
(45) Date of Patent: Jan. 23, 2007

(54) SYSTEM FOR INSTALLING CHAINS ON VEHICLE TIRES

(76) Inventor: Robert C. Lyne, Jr., 10207 Maremont Cir., Richmod, VA (US) 23233

( * ) Notice: Subject to any disclaimer, the term of this patent is extended or adjusted under 35 U.S.C. 154(b) by 0 days.

(21) Appl. No.: 10/764,160

(22) Filed: Jan. 23, 2004

(65) Prior Publication Data

US 2004/0148750 A1 Aug. 5, 2004

Related U.S. Application Data

(60) Division of application No. 10/241,968, filed on Sep. 12, 2002, now Pat. No. 6,681,657, which is a continuation of application No. 09/879,629, filed on Jun. 12, 2001, now abandoned, which is a continuation-in-part of application No. 09/471,664, filed on Dec. 24, 1999, now Pat. No. 6,263,554, and a continuation-in-part of application No. 09/033,886, filed on Mar. 3, 1998, now abandoned.

(60) Provisional application No. 60/039,794, filed on Mar. 4, 1997.

(51) Int. Cl.
*B60C 27/06* (2006.01)

(52) U.S. Cl. .................. 81/15.8; 29/407.01; 29/407.09

(58) Field of Classification Search ............. 29/407.01, 29/407.09, 429, 281.1; 152/213 R, 217; 81/15.8; 254/88
See application file for complete search history.

(56) References Cited

U.S. PATENT DOCUMENTS (Continued)

FOREIGN PATENT DOCUMENTS

DE 155837 3/1938

OTHER PUBLICATIONS http://dictionary.reference.com/search?q=compartment. Definition of "compartment" from Dictionary.com.*

*Primary Examiner*—Marc Jimenez

(57) ABSTRACT

A drive-on system for installing a tire chain (i.e., snow chain) on a pneumatic tire mounted on a vehicle wheel. The system includes a U-shaped installation tool whose arms releasably engage fastening elements (hooks or links) at one end of each side chain, and a installation tray or ramp in which the connected tire chain and tool are arranged, and may be stored, prior to installation, with the tire chain in a partially laid-out orientation and the tool preferably within a tool compartment in the tray. To install the tire chain, the vehicle is driven onto the tray and stopped, preferably in a predetermined optimum position in response to a signal initiated by a position-indicating switch on the tray. Then the tool, with one end of the tire chain connected to it and trailing it, is drawn upward and circumferentially around the tire. With the tool bridging the tread of the tire so that its arms extend along the opposite sidewalls, the tire chain is draped and tensioned substantially in the correct position on the tire. The fastening element at the other, free end of each side chain is then removed from its place in the tray and connected to the mating fastening element. The connection on the inner sidewall is preferably made while the tool is still connected, which enables the arm of the tool on the inner sidewall to be used to guide the free element into contact and connection with the element connected to the tool.

20 Claims, 10 Drawing Sheets

U.S. PATENT DOCUMENTS

| | | | | | |
|---|---|---|---|---|---|
| 1,067,940 | A | * | 7/1913 | Rohe | 238/14 |
| 1,914,760 | A | * | 6/1933 | Stiles | 81/15.8 |
| 2,022,804 | A | | 12/1935 | Garey | |
| 2,604,802 | A | | 7/1952 | Rhoads et al. | |
| 3,756,097 | A | * | 9/1973 | Whitlock | 81/15.8 |
| 3,845,875 | A | * | 11/1974 | Douglas et al. | 220/556 |
| 3,893,500 | A | | 7/1975 | Planz | |
| 4,194,724 | A | | 3/1980 | Masegian | |
| 4,249,657 | A | | 2/1981 | Bates | |
| 4,977,400 | A | | 12/1990 | Jeffries | |
| 5,221,380 | A | | 6/1993 | Wilson | |

* cited by examiner

FIG.2
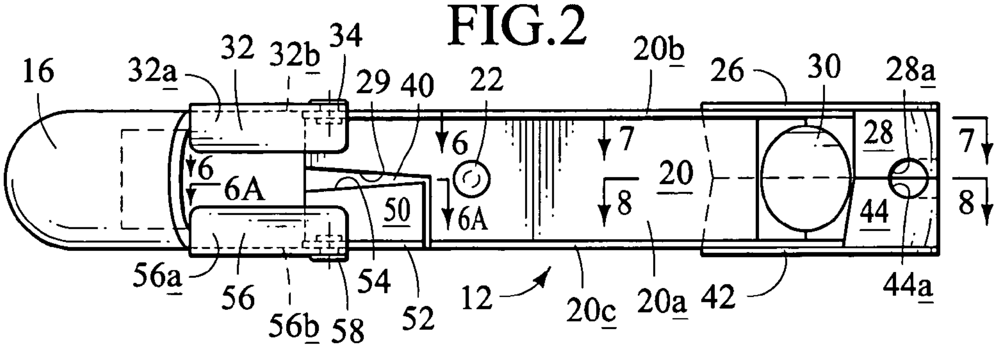
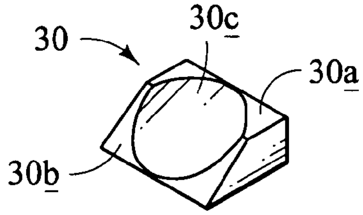
FIG.15
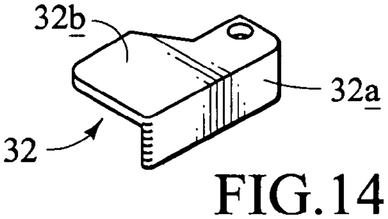
FIG.14
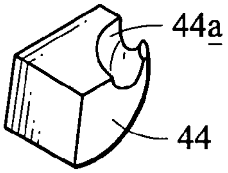
FIG.16
FIG.3
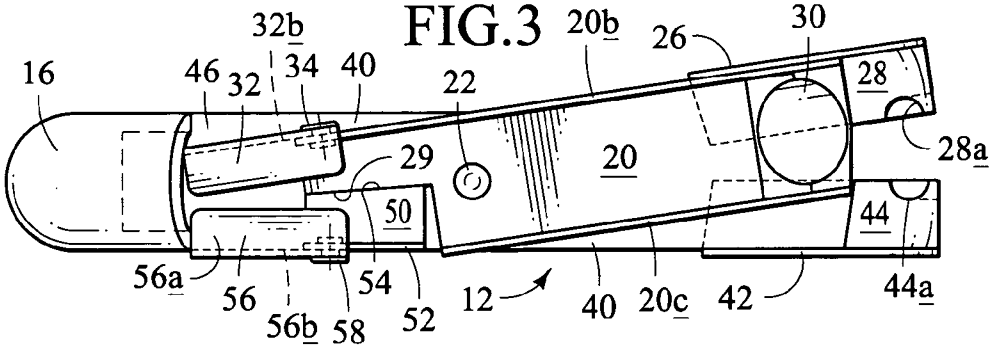
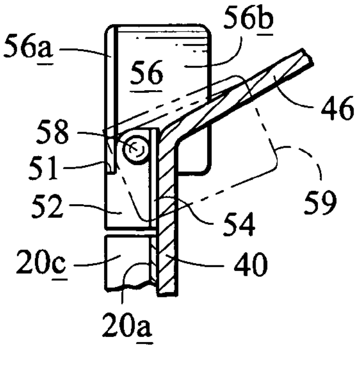
FIG.6A
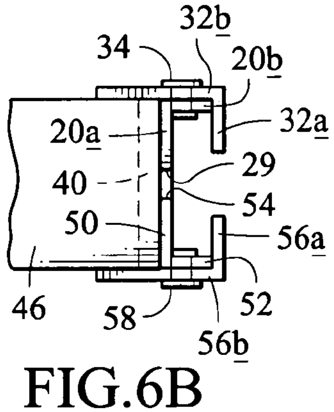
FIG.6B

SYSTEM FOR INSTALLING CHAINS ON VEHICLE TIRES

RELATED APPLICATIONS

This application is a division of application Ser. No. 10/241,968 filed Sep. 12, 2002 and now issued as U.S. Pat. No. 6,681,657. Application Ser. No. 10/241,968 is a continuation of application Ser. No. 09/879,629 filed Jun. 12, 2001 now abandoned. Application Ser. No. 09/879,629 was copending with and a continuation-in-part of application Ser. No. 09/471,664 filed Dec. 24, 1999 and now issued as U.S. Pat. No. 6,263,554. Application Ser. No. 09/471,664 was copending with and a continuation-in-part of application Ser. No. 09/033,886 filed Mar. 3, 1998 and now abandoned. Application Ser. No. 09/033,886 was copending with provisional patent application Ser. No. 60/039,794, filed Mar. 4, 1997. Each of those five earlier applications is titled "System for Installing Chains on Vehicle Tires". This application discloses and claims subject matter disclosed in the five earlier applications and relies on them under 35 U.S.C. 120. The disclosures of the five earlier applications not repeated or superseded by the disclosure herein are hereby incorporated by reference herein.

TECHNICAL FIELD

This invention pertains to the field of installing traction-enhancing chains on pneumatic tires of wheeled vehicles, for use on mud, snow, and ice surfaces.

BACKGROUND ART

The advantages of tire chains have been known for many years. When needed, tire chains provide enhanced traction on mud, snow, and ice surfaces, both for moving and for stopping the vehicle. Also, tire chains are relatively inexpensive and do not affect vehicle ride, handling, fuel economy, or performance when they are not necessary, which is at least 99 percent of the time for 99 percent of the people in the United States.

Also known are the disadvantages of tire chains, which, assuming well designed chains are properly selected for a given vehicle, tend to fall into three categories. The first category is installation. The disadvantages within this category include the considerable time required for installation and the physical difficulty and discomfort involved, often under adverse weather conditions, darkness, or stress. They may further include, depending upon whether a jack is employed, safety considerations or the need to re-adjust the chains after the vehicle has been driven. These disadvantages are described further in the patents identified below and in other patents in U.S. patent and Trademark Office subclasses 152/213R and 81/15.8. The second category of disadvantages is operation of the vehicle after the chains have been installed. These disadvantages include chain wear and breakage, limitations on vehicle speed, vibration and accelerated wear of the vehicle, possible damage to the vehicle resulting from breakage of worn chains, and damage to the pavement. These disadvantages are greatly amplified by operation of the vehicle on bare pavement. The third category is removal of the chains from the tire.

These three categories of disadvantages are directly related, in that solutions to installation and removal problems ameliorate problems during vehicle operation. This is because, as a practical matter, the ability to install and remove tire chains quickly and easily enables the user to remove them as soon as the vehicle reaches bare pavement, knowing that the tire chains can be readily re-installed as soon as (or if) they are needed again. Theoretically, perfect solutions to the installation problems and removal problems would eliminate nearly all of the operating problems. That is, if tire chains could be installed instantly by a mere snap of the driver's fingers immediately before serious snow or ice are encountered, and removed in the same manner when no longer needed, their above-mentioned operating disadvantages would disappear.

Some solutions involve ramps having spaced lateral grooves. After the tire chain is laid out with its cross chains lying loosely in the grooves, the vehicle is driven onto the ramp. The grooves allow the cross chains to be adjusted to positions where the necessary degree of tension can be attained before the ends of the chain are connected. See, for example, Garey U.S. Pat. No. 2,022,804. Such drive-on ramps are most efficiently used in pairs, one pair for each pair of drive wheels. A problem presented by ramps is the difficulty of stopping the vehicle at the desired position on the ramp. One approach to solving this problem is to provide a stop for the wheel, as disclosed for example in Rhoads et al U.S. Pat. No. 2,604,802. This approach is not always effective, because under actual conditions it is difficult for the driver to feel the stop through the vehicle and distinguish it from other bumps, and he or she may drive the vehicle over the stop. A better approach is to signal the driver that the vehicle has reached the correct position, as taught for example by Masegian U.S. Pat. No. 4,194,724. Another significant improvement in ramps was the provision for storage with the chain oriented on the ramp, which Planz U.S. Pat. No. 3,893,500, "Chain Caddy", accomplished by upstanding edges on the ramp.

Other solutions to the problems of installing tire chains involve tools for engaging end elements of the chain. An examples is Nakata U.S. Pat. No. 4,210,036 (hinged elongated rod). Other examples are Dalaba U.S. Pat. No. 4,703,675 and Stiles U.S. Pat. No. 1,914,760 (U-shaped tools to hold end of chain to tire during rotation to wind chain on tire). U-shaped tools have also been used with tire chains for other purposes, as shown for example by Krennwallner German patent 155,387 (tensioning device).

Other solutions avoid the use of a jack or a ramp by applying a tire chain configured so that its ends can be connected with the cross chains nearest the ends outside the footprint of the tire and with no chain beneath the footprint. This involves a compromise between ideal spacing between cross chains and achieving proper tension, and usually requires driving and stopping the vehicle after the tire chains have been installed and re-adjusting them. Also, a popular way of accomplishing this installation is to use a large hoop as an integral part of each tire chain. The hoop makes the tire chain difficult to store and handle and may require extensive manipulation of the tire chain under and on the sidewalls of the tire. The hoop also makes removal of the tire chain more difficult.

Despite the large number of patents directed to solving the problems of installing a tire chain, there remains a need for a single system which is capable of performing all of the following functions:

(a) storing an oriented tire chain having conventional side chains;

(b) handling and positioning the ramp and chain with respect to the tire before the vehicle is driven;

(c) correctly positioning the tire with respect to the chain when the vehicle is stopped;

(d) placing the chain, untwisted, on the tire in approximately the correct position;

(e) adjusting and tensioning the chain;

(f) ascertaining the location of the fastening elements at the end of the chain; and (g) positively connecting those elements.

Such a system should accomplish the foregoing in the following manner:

(h) without fumbling or unsuccessful attempts by the user;

(i) while minimizing or eliminating contact of the user's hands with the chain, or the user's body with the ground or snow;

(j) without requiring exceptional mechanical ability, strength, or dexterity on the part of the user;

(k) simply, reliably, and inexpensively; and (l) quickly.

Generally speaking, the last requirement, "quickly", embraces many of the other requirements and will be the major factor determining the efficacy of the system.

SUMMARY OF THE INVENTION

The present invention is a drive-on system for installing tire chains, including storage and handling, on a pneumatic tire mounted on a vehicle wheel. Its object is to meet the need described above in the manner described above.

The inventive system utilizes a U-shaped installation tool having arms extending outwardly from opposite ends of a transverse body member or handle. Movable clasp mechanisms at the ends of the arms releasably but securely engage an end element at one end of each side chain. Each clasp mechanism comprises coacting members which are relatively movable to both a confining configuration, in which the clasp mechanism will confine the element, and a releasing configuration, in which it will release the element. The arrangement of the elements of the tool corresponds roughly to the anatomy of a hardshell crab.

The system also utilizes a tray-like device in which the tire chain and the tool are arranged, and may be stored, in a partially laid-out orientation prior to installation. This device, which performs the function of the ramps and chain caddy referred to above, will be referred to hereinafter as an "installation tray" or "tray". The installation tray has longitudinal channels and transverse channels for holding laid-out side chains and cross chains, respectively, and a well for holding side chains and cross chains which are not laid out. The installation tray also has a compartment adjacent the well for holding the tool and protecting it from damage due to the weight of the vehicle.

The method of installing the tire chain is as follows. The untwisted tire chain is arranged in the tray with the tool connected to it, as described above. The vehicle is driven onto the tray and stopped when the vehicle is in a predetermined, optimum position with respect to the tray and chain. Holding the handle, the user picks up the tool and draws it, with one end of the tire chain trailing it, upward and circumferentially around the tire. With the tool straddling the tire so that its handle bridges the tread of the tire and its arms extend along the opposite sidewalls, the tire chain is disposed and tensioned substantially in its correct position on the tire. The fastening element at the other, free end of each side chain is then brought up and connected to the mating fastening element. The connection of the side chain elements on the inner sidewall may be made while the tool is still connected to the fastening element, which enables the arm of the tool on the inner sidewall to be used to guide the free element into contact and connection with the element connected to the tool. In most cases this eliminates the need for the user to see the two elements being connected and the need to hold the two elements with both hands simultaneously, so that the user does not need to lie on the ground. After the tool is disconnected from the chain, the vehicle is driven off the tray.

The system according to the invention may include additional features. The inner arm of the tool may have flanges defining a channel for guiding the free fastening element into proximity and contact with the fastening element held by that arm. An inclined ramp-like surface may be disposed in that channel. The tray may have slots for locating and restraining the free fastening elements, and stacking lugs and recesses to permit a plurality of trays to be stacked during storage. A device may be provided in a recess in the tray to sense the position of the tire and initiate a signal to stop the vehicle. The position of the signal-initiating device relative to the transverse channels in the tray may be adjustable. Preferably the signal issues when, and only when, the tire is positioned within a predetermined theoretical zone defined by boundaries spaced along the longitudinal axis of the tray, so that the device is able to sense and signal the stopped position of the tire as well as the position of the tire while it is still moving. The chain elements held by the arms of the tool may be released therefrom by the action of a readily accessible latch or similar locking device under the control of and actuated by the user. Force for opening the claws of the tool may be applied to the open latch. The handle of the tool may be articulated to permit the claws of the two arms, and the elements of the chain they hold, to be brought close to each other. The tool may have features which enable it to be easily adapted and used for tires of different sizes.

BRIEF DESCRIPTION OF THE DRAWINGS

FIG. 2 is a left side view of the tool shown in FIG. 1, showing the inner arm in a closed, confining position.

FIG. 3 is a view similar to FIG. 2, with the claws in an open, releasing position.

FIG. 6A is a view of a section taken at 6A—6A in FIG. 2.

FIG. 6B is a fragmentary rear elevation view of the inner (left) arm of the tool shown in FIG. 1.

FIG. 14 is a perspective view of the latch of the inner arm of the tool shown in FIGS. 1, 2, and 3.

FIG. 15 is a perspective view of the ramp-like member of the inner arm shown in FIGS. 1, 2, 3, 7, and 8.

FIG. 16 is a perspective view of the bottom claw of the inner arm shown in FIGS. 1, 2, 3, and 8.

Figures 1, 6, 7, 8, 9, 10, 11, 12, 13:
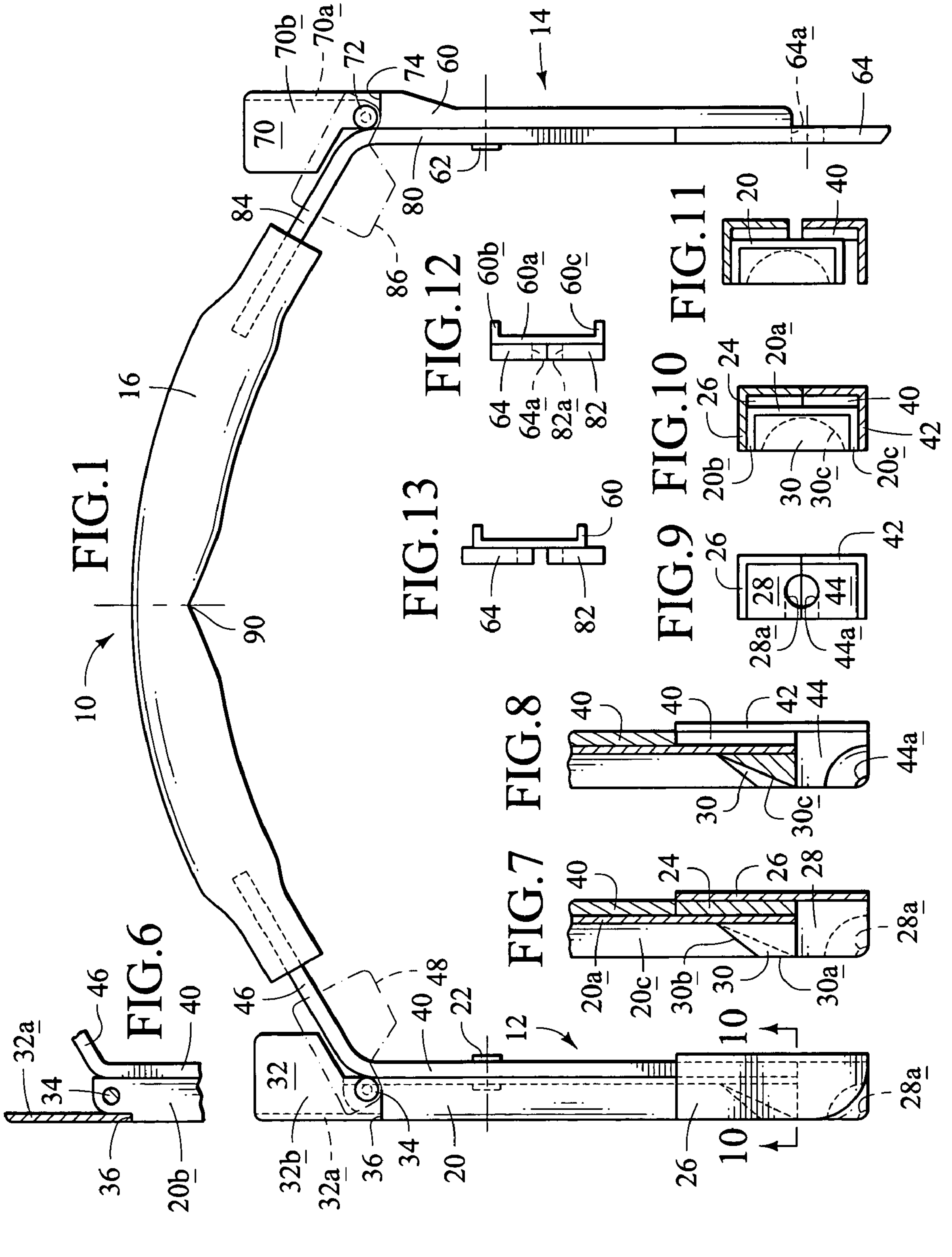
FIG. 1 is a plan view of a tool according to the invention.
FIG. 6 is a view of a section taken at 6—6 in FIG. 2, along the top surface of the top member.
FIG. 7 is a view of a section taken at 7—7 in FIG. 2, along the bottom surface of the top flange of the top member.
FIG. 8 is a view of a section taken at 8—8 in FIG. 2, along the longitudinal axis of symmetry of the inner arm.
FIG. 9 is a front elevation view of the inner (left) arm of the tool shown in FIG. 1.
FIG. 10 is a section view taken at 10—10 in FIG. 1.
FIG. 11 is a view similar to FIG. 10, with the claws of the tool slightly open.
FIG. 12 is a front elevation view of the outer (right) arm of the tool shown in FIG. 1.
FIG. 13 is a view similar to FIG. 12, with the claws of the tool slightly open.

The drawings show the tool and the tray approximately to scale. The actual distance between the inner and outer arms of the tool as shown is 8.25 in. The actual length of the tray as shown is 33.0 in.

DESCRIPTION OF THE PREFERRED EMBODIMENT

Definitions

The following terms will be used throughout this application in accordance with these definitions, unless a different interpretation is required by the context.

The term "tire" refers to an inflated tire mounted on a rim which is a component of a wheel on a vehicle. The tire has a tread which joins 2 sidewalls—an "inner" sidewall toward the shaft driving the wheel and an opposite, "outer" sidewall. The terms "inner" and "outer" will be used in a similar manner to refer to an arm of the tool intended to be used adjacent a sidewall. The "width" of the tread is the distance between its edges, in the direction parallel to the axis of rotation of the wheel. The "maximum width" or "section width" of the tire is its maximum width in a direction parallel to the wheel's axis of rotation and is conventionally the nominal width of the tire. The "radius" of the tire is the distance from the axis of rotation to the ground. The "footprint" of the tire is the portion of its tread which is in contact with the ground. The "bottom dead center" or "BDC" of the tire is the line where its bottom surface intersects a vertical plane including the axis of rotation; the BDC will be approximately at the center of the footprint when the tire is resting on a flat surface.

The term "tire chain" refers to what is installed or is intended to be installed on a single tire. "Tire chain" and "snow chain" are synonyms. A tire chain includes side chains and cross chains joined together. The term "chain" alone will be used to refer to any two or more elements of a tire chain. The term "element" refers to any permanent element of a side chain or a cross chain, such as a link, a "cross chain hook" connecting a cross chain with a side chain, or a fastening hook at an end of a side chain. The term "locking hook" will refer to a fastening hook having a camming or locking mechanism. The term "open hook" will refer to a rigid fastening hook of the type normally used adjacent the inner sidewall of the tire. A fastening hook and the link at the opposite end of the side chain to which it is or is intended to be connected will be said to be "mating". The term "fastening element" will refer to a hook or a mating link. The "interior space" defined by a fastening element will refer to the interior space within the element which has the thickness of the element's interior surfaces defining it; for example, the interior space of a typical chain link having a thickness T and an interior width W will be an oval having a thickness T and a width W, with the peripheral surface of the oval being concave, as defined by the convex interior surface of the link. The term "free", as used with reference to a chain element, means that the element is not connected to the tool, and thus may refer to an element held by the user or restrained by a holder on the tray. The term "side chain circle" will refer to a circle drawn through the angles of a polygon formed by a side chain installed on a tire.

A "connection angle" is the angular position on the tire where, after the tire chain has been properly draped and tensioned, the fastening elements on opposite ends of a side chain are connected; the connection angle is measured from the BDC about the axis of rotation of the wheel. The term "interference" will refer to contact of the tool or the hands of the user with a nearby portion of the vehicle (e.g., fenders, mudguards, frame, brakes, steering mechanism, or shock absorbers). The term "clearance" will refer to distance between the tire and such a portion of the vehicle which limits positioning or operation of the tool or the hands of the user.

The terms "front" and "rear" will be used consistently to refer to the installation tray as though it were a garage facing a street. That is, the tire is intended to enter the front of the tray and stop before it reaches the rear. Similarly, the terms "front" and "rear" will to refer to the installation tool in its orientation when lying in the installation tray, but when the tool is in a different orientation will not correlate to those terms as applied to the tray. As used with respect to the tray and tool, “front” and “rear” will not necessarily correlate to the direction the vehicle is driven or its orientation. To avoid confusion, the terms “in low gear” will refer to driving the vehicle with the transmission in drive, low gear, or another forward gear, and “in reverse” will refer to driving the vehicle with the transmission in reverse.

The term “mirror image” refers to symmetry about a longitudinal, vertical plane.

Tool

Installation tool 10 consists of inner arm 12 and outer arm 14 extending from opposite ends of transverse handle or body member 16.

Figure 5:
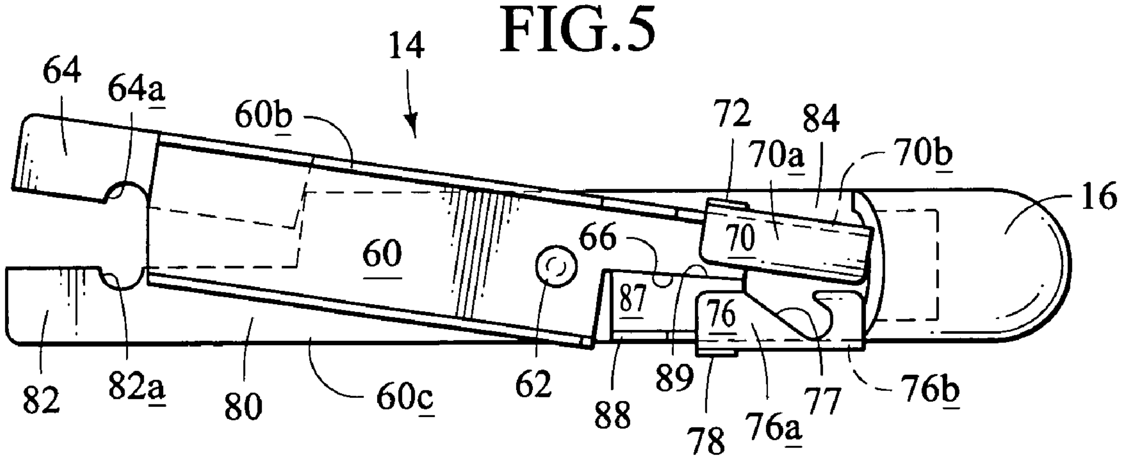
FIG. 5 is a fragmentary view similar to FIG. 4, with the claws in an open, releasing position.

As shown in FIGS. 1 and 3, inner arm 12 consists of top member 20 and bottom member 40 pivotally connected by rivet 22. Similarly, as shown in FIGS. 1 and 5, outer arm 14 consists of top member 60 and bottom member 80 pivotally connected by rivet 62.

Top member 20 of inner arm 12 is channel-shaped, with web 20*a* joining top flange 20*b* and bottom flange 20*c*, which are on the side of the arm opposite handle 16; see FIGS. 7 and 10. Spacer 24, claw holder 26, and claw 28 are fixed to the front of top member 20 by fasteners or adhesive (not shown); see FIGS. 7 and 9. Claw 28 has in its flat, horizontal, lower surface a groove 28*a* which curves in a quarter-circular arc and has a semicircular cross section; see FIGS. 2, 3, 7, and 9. Immediately adjacent groove 28*a*, at the edge of claw 28 on the side of groove 28*a* away from handle 16, is nib or projection 28*b*. At the rear of claw 28 is ramp-like member 30 fixed in the channel of top member 20; see FIGS. 2, 3, 7, 8, and 15. Ramp-like member 30 has flat surface 30*a* parallel to web 20*a* and flat surface 30*b* inclined so that it extends from the level of web 20*a* to the level of claw 28. A cylindrical cavity in surfaces 30*a* and 30*b* creates a concave surface 30*c* extending from web 20*a* to claw 28. At the rear end of top member 20 is downwardly facing stop surface 29; see FIGS. 2 and 3. Above stop surface 29 is latch 32, which comprises side leg or panel 32*a* and top leg or panel 32*b*; see FIGS. 1, 2, 3, 6, and 14. Latch 32 is pivotally connected to top flange 20*b* by rivet 34. By contacting latch side panel 32*a*, rearwardly facing stop surface 36 and the adjacent straight side edge of top flange 20*b* limit rotation of latch 32 in the direction away from the handle (counterclockwise as shown in FIGS. 1 and 6). This is the open or unlatched position of latch 32, since it allows top member 20 and bottom member 40 to pivot about rivet 22 as shown in FIG. 3.

Bottom member 40 of inner arm 12 has claw holder 42 and claw 44 fixed to its front end; see FIGS. 2, 3, 8, and 9. Like claw 28, claw 44 has in its flat, horizontal upper surface groove 44*a* which curves in a quarter-circular arc and has a semicircular cross section; see FIGS. 2, 3, 8, 9, and 16. Immediately adjacent groove 44*a*, at the edge of claw 44 on the side of groove 44*a* away from handle 16, is nib or projection 44*b*, as best illustrated in FIG. 16. At its rear end, bottom member 40 merges at a 120° angle into angular member 46 which is part of the handle. Abutment 50 is secured by fasteners or adhesive (not shown) to the rear of bottom member 40; see FIGS. 2, 3, 6A, and 6B. Abutment 50 has rearwardly facing stop surface 51, flange 52, and upwardly facing stop surface 54. Grip 56 having side leg or panel 56*a* and bottom leg or panel 56*b* is pivotally connected to flange 52 by rivet 58, which is below and on the same axis as rivet 34. By contacting grip side panel 56*a*, rearwardly facing stop surface 51 and the adjacent straight side edge of abutment flange 52 limit rotation of grip 56 in the direction away from the handle (counterclockwise in FIG. 6A). In this position latch side panel 56*a* forms an angle of 180° with bottom member 40.

Rotation of latch 32 in the direction toward the handle (clockwise in FIGS. 1 and 6) is limited by angular member 46, which is contacted by the inside surface of latch side panel 32*a*. Phantom lines 48 in FIG. 1 show this 120° position for latch 32. This is the latched position of latch 32, since its top panel 32*b* is blocked by angular member 46 and thus top member 20 and bottom member 40 cannot pivot about rivet 22. Friction at rivet 34 keeps latch 32 in the latched position until the user rotates it to the unlatched position. If additional resistance to unintended rotation is desired, the friction between latch top panel 32*b* and angular member 46 may be increased by providing a thin rubber sleeve (not shown) stretched around the portion of angular member 46 beneath latch 32. Alternatively, a pinhead-size, downwardly embossed button detent (not shown) can be provided in top panel 32*b* to engage angular member 46 in the 120° position. The operation of grip 56 is similar to that of latch 32. Rotation of grip 56 in the direction toward the handle (clockwise in FIG. 6A) is limited by angular member 46, which is contacted by the inside surface of grip side panel 56*a*. Grip 56 does not perform a latching function. Phantom lines 59 in FIG. 6A show this 120° position for grip 56. Since latch 34 and grip 56 are located much closer to handle 16 than to clasp mechanism 28, 44, they are easily accessible and visible to the user, when in use as described later.

When latch 32 is in the unlatched position, a squeezing force applied by the user to the surfaces of latch top panel 32*b* and grip bottom panel 56*b* causes top member 20 and bottom member 40 to pivot about rivet 22 like pliers, and separates claws 28, 44; see FIG. 3. Grip 56 provides an improved bottom surface and increased leverage for applying the squeezing force to cause top member 20 and bottom member 40 to pivot about rivet 22. Although it is not necessary to rotate grip 56 to the 180° position, the user will find it intuitive and easy to simply rotate both latch 32 and grip 56 to the 180° position, and then squeeze their similar, parallel, superimposed surfaces together. The pivotal movement of top member 20 with respect to bottom member 40 stops when stop surface 29 contacts stop surface 54; see FIG. 3, which shows inner arm 12 in the fully open, releasing configuration.

When claws 28, 44 are together, their grooves 28*a*, 44*a* are aligned to form a quarter-circular passage having a circular cross section; see FIGS. 2, 7, 8, and 9. Claws 28, 44 will positively and securely engage and hold an element of an inner side chain, and they will continue to confine the element as long as latch 32 is in the latched position, in such a manner that arm 12 of the tool will remain in this closed, confining configuration and connected to the element during storage, handling, and installation of the tire chain, irrespective of the relative positions of the element and the arm and irrespective of the directions of forces pulling on them. Though most of these pulling forces exerted on the arm during installation will be substantially longitudinal forces in a direction toward the tensioned side chain trailing it, and away from the handle (i.e., generally to the right in FIG. 2 and away from handle 16), pulling forces exerted sporadically on the arm during storage and handling, when the chain is slack and not oriented, are likely to come from various other directions. Claws 28, 44 may clasp the element loosely, and are not intended to grip the element by applying a continuous squeezing force.

Thus, claws 28, 44 constitute members of a clasp mechanism which are easily and repeatedly movable, relative to each other, into and out of two alternative configurations—a closed, confining configuration shown in FIG. 2 and an open, releasing configuration shown in FIG. 3. Nibs 28*b* and/or 44*b* immediately adjacent the passage defined by grooves 28*a* and/or 44*a* are projections which penetrate into and occupy interior space within the fastening element. (While nibs 28*b*, 44*b* are shown in FIG. 2 to be in contact, it will be apparent that such contact is not essential in order to confine the fastening element, so long as the nibs are made of a relatively rigid, non-resilient material and the distance between the nibs is significantly less than the thickness of the fastening element.)

Top member 60 of outer arm 14 is channel-shaped, with web 60*a* joining top flange 60*b* and bottom flange 60*c*; see FIGS. 1, 4, 5, and 12. Claw 64, which has semicircular opening 64*a*, is fixed to the front of top member 60 by fasteners or adhesive (not shown); see FIGS. 1, 4, 5, 12, and 13. Nib or projection 64*b* is immediately adjacent opening 64*a* on the side away from handle 16. At the rear end of top member 60 are downwardly facing stop surface 66, latch 70 (including side panel 70*a* and top panel 70*b*), stop surface 74, and rivet 72.

Bottom member 80 of outer arm 14 terminates at its front end in claw 82 which has semicircular opening 82*a*, and at its rear end merges into angular member 84; see FIGS. 1 and 2. Nib or projection 82*b* is immediately adjacent opening 82*a* on the side away from handle 16. Also at the rear end of bottom member 80 are abutment 87 (including flange 88 and stop surface 89), hanger grip 76 (including side panel 76*a* and bottom panel 76*b*), and rivet 78; see FIGS. 4 and 5. Side panel 76*a* forms hook 77.

Figure 4:
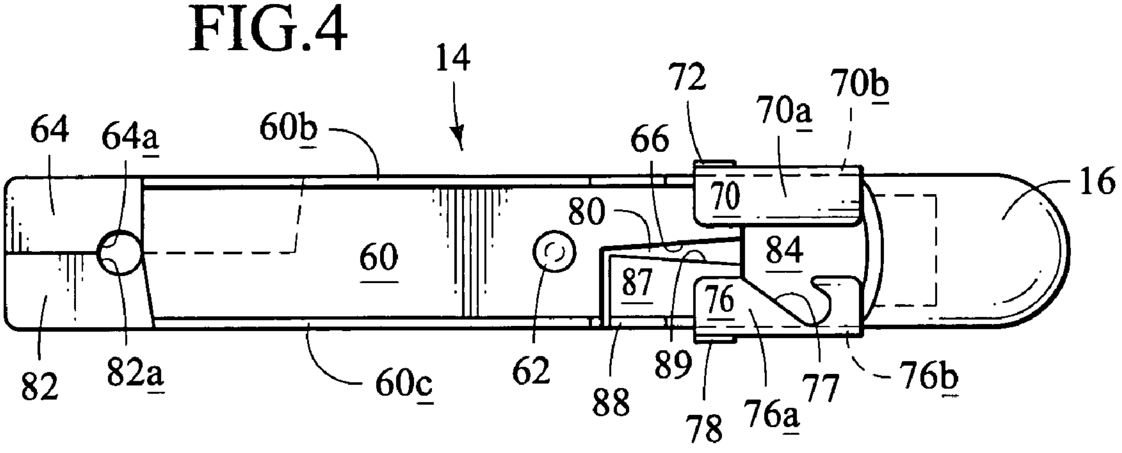
FIG. 4 is a right side view of the tool shown in FIG. 1, showing the outer arm in a closed, confining position.

When claws 64, 82 are together, semicircular openings 64*a* and 82*a* are aligned to form a circular passage; see FIG. 4. Claws 64, 82 will positively and securely engage and hold an element of an outer side chain, and they will continue to confine the element as long as latch 70 is in the latched position, in such a manner that arm 14 will remain in this closed, confining configuration and connected to the element during storage, handling, and installation of the tire chain, irrespective of the relative positions of the element and the arm and irrespective of the directions of forces pulling on them. Claws 64, 82 may clasp the element loosely, and are not intended to grip the element by applying a continuous squeezing force.

Except for claws 64, 82, the depths of flanges 60*b*, 60*c*, and hook 77, the structure of outer arm 14 and the movement of its components are essentially mirror images of those of inner arm 12. The clasp mechanisms of inner arm 12 and outer arm 14 operate and respond to pulling forces in essentially the same way. Latch 70 and hanger grip 76 operate in essentially the same way as latch 32 and grip 56. The latched position of latch 70 is shown in FIG. 1 by phantom lines 86. FIG. 5 shows outer arm 14 of this embodiment in the fully open, releasing configuration, in which stop surfaces 66 and 89 are in contact with each other.

Handle 16 is articulated, in that hinge 90 allows claws 28, 44 of inner arm 12 and claws 64, 82 of outer arm 14 to be brought together. Handle 16 is preferably made from a nonmetallic material, so that it will not rapidly conduct heat away from the user's hand. A resilient material such as a section of rubber hose is suitable. The hinge may be created by folding the hose and compressing the fold in a vise, and the ends of the hose may be telescoped over a reduced height portion of angular members 46 and 84 and fastened with rivets (not shown). This permits easy rotation of handle 16 at hinge 90 in the plane of tool 10, and, with considerably more force, limited rotation out of that plane.

The tool shown in FIGS. 1–16 is desirably one of a pair used together so that tire chains can be installed on two drive wheels without moving the vehicle more than once. The tools may be used either upside down or right side up (as will be described later), but they have been described in the orientation in which the latch is on top. This orientation is preferred when the end elements of the side chains are being connected on the tire, because the latches are more visible and accessible. Thus, assuming that the latches will be up (i.e., exposed to the user) when the connections are made, the tool shown in FIGS. 1–16 is intended for use on the driver side (left) wheel if the tray will be placed ahead of the wheel and the vehicle driven in low gear onto it, or on the passenger side wheel if the tray is being placed behind the wheel and the vehicle driven in reverse onto it. For the other two situations (driver side/in reverse and passenger side/in low gear) the tool will be the mirror image of the tool shown in FIGS. 1–16. The terms "top" and "bottom", as applied to members 20, 40, 60, 80, for example, are merely to identify these parts for convenience in describing them. The length and spacing of arms 12, 14 will vary with the radius and width of the tire, as will be described later.

While symmetry between the inner and outer arms simplifies description and manufacture, it is not essential. These considerations may be overridden in some applications by differences in the requirements to be met by the inner and outer arms, for example, the requirements peculiar to the inner arm that it operate in an enclosed space and that its connection to the tire chain will probably not be visible to the user.

In an alternative embodiment of the installation tool, the bottom half of top member 60 of outer arm 14 is eliminated while preserving the hole for rivet 62 by curving the new lower edge in a circular arc around it, and abutment 87 is extended forward to occupy the space thereby created. The top and bottom members then separate cleanly along a horizontal axial plane (with the exception of the portions held by the rivet), instead of overlapping like a pair of scissors, and each member has a flange and half of a ramp-like member as well as a claw. Inner arm 12 is similarly constructed, with the claws being attached directly to members similar to outer claws 64, 82.

It will be understood that the clasp mechanisms need not be as specifically described, and need not utilize pivotal motion. A component of the clasp may be arranged to move relative to another component of the clasp in a different relationship, such as parallel to the arm or up, down, or sideways with respect to the arm. For example, an arm may include a tube or casing of rectangular cross-section with a threaded shaft extending longitudinally inside it. At one end the casing forms a seat for an exterior surface of the fastening element, and a hook slides longitudinally within the casing. The outer end of the hook performs the function of claws 28, 44 by engaging an interior surface of the fastening element and pulling it into the seat, while the inner end of the hook is threaded on the shaft. By rotating a visible knob attached to the shaft outside the other end of the casing, the fastening element may be either pulled into the seat to confine and lock it or ejected from the casing to release it. A sliding or pivoting latch extending between the knob and the casing may be employed for locking the clasp for quick release. Other examples include a pin-and-yoke, or an overedge engagement-type mechanism. In all variations it is desirable that the latch or other locking device be visible, readily accessible, and easily operated by the user. It is also desirable that the arm holding the fastening element be relatively thin in the horizontal direction (no wider than the widest part of the tire chain) and free of abrupt changes in the profile of its surface, in order to minimize the potential for interference.

Tray

Figure 17:
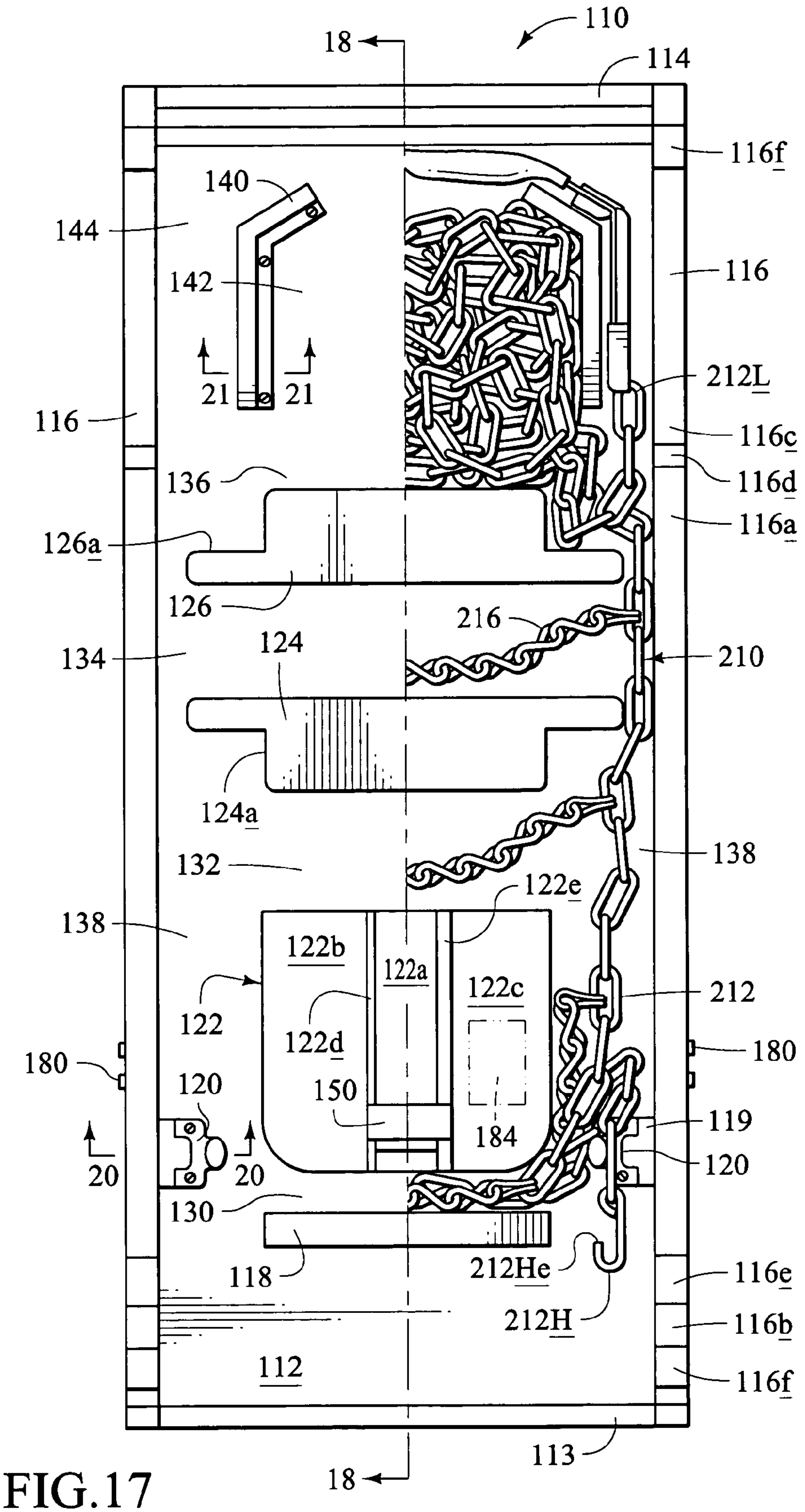
FIG. 17 is a plan view of a tray according to the invention with the right hand side shown loaded with an oriented tire chain connected to a tool.
Figure 18:
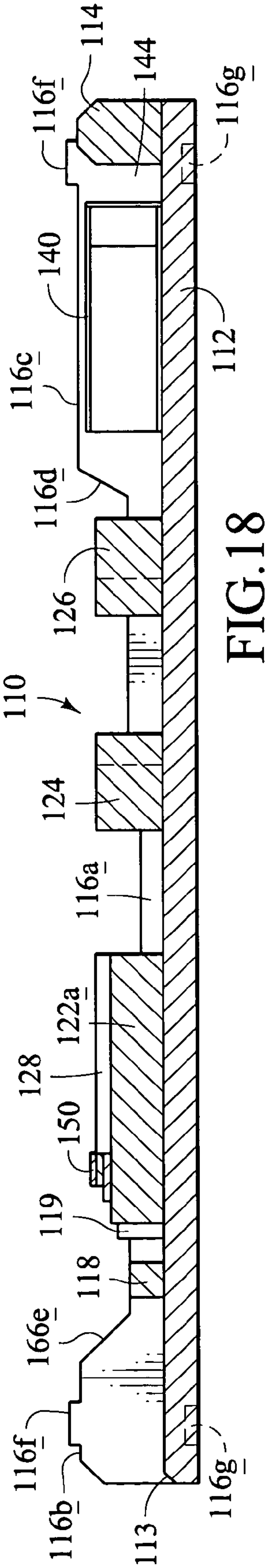
FIG. 18 is a section of FIG. 17 taken at 18—18.
Figure 21:
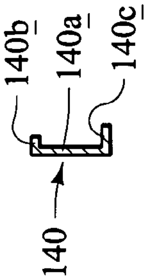
FIG. 21 is a section of FIG. 18 taken at 21—21.
Figure 20:
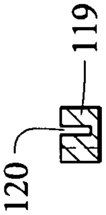
FIG. 20 is a section of FIG. 17 taken at 20—20.
Figure 19:
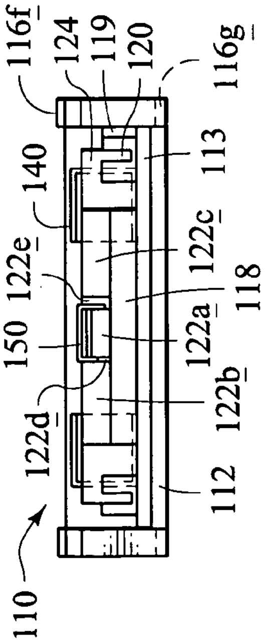
FIG. 19 is a front elevation view of the tray shown in FIG. 17, without a tire chain and tool.
Figure 22:
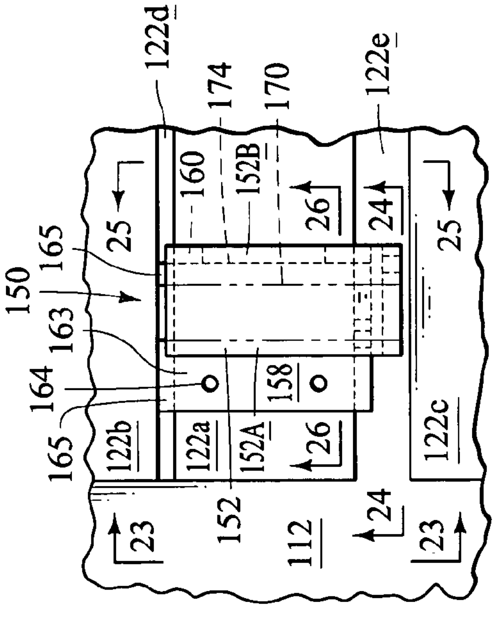
FIG. 22 is an enlarged, fragmentary view of the portion of FIG. 17 showing the switch.
Figure 23:
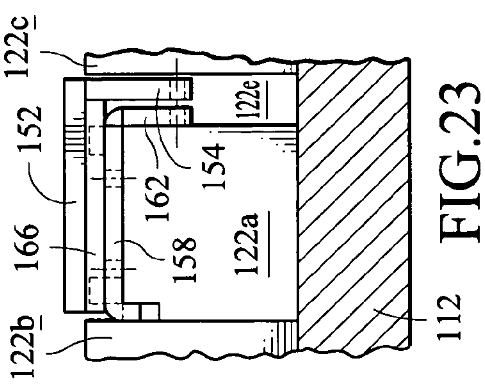
FIG. 23 is a section of FIG. 22 taken at 23—23.
Figure 24:
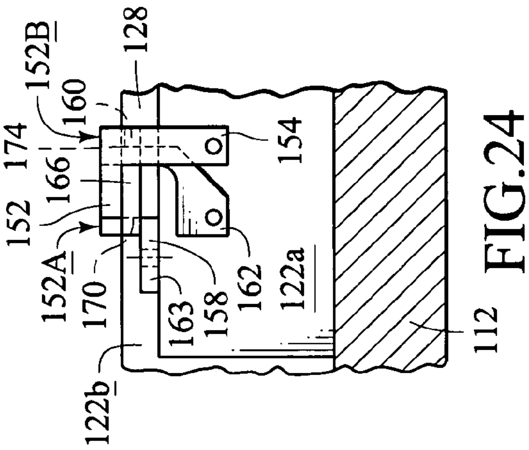
FIG. 24 is a section of FIG. 22 taken at 24—24.
Figure 25:
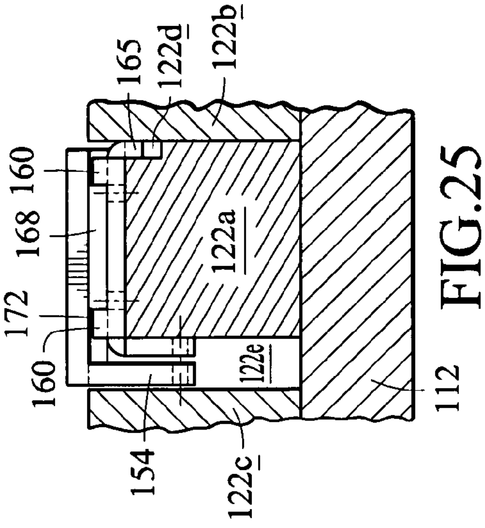
FIG. 25 is a section of FIG. 22 taken at 25—25.

Turning now to tray 110 shown in FIGS. 17–21, and disregarding for the moment the tire chain and tool shown in the right hand side of FIG. 17, base or floor 112 with front, entrance lip 113 has, upwardly extending therefrom, rear wall 114 and side walls 116 joined thereto. Side walls 116 each have a low portion 116*a*, a high portion 116*b* toward the front, another high portion 116*c* toward the rear, step 116*d* between portions 116*c* and 116*a*, and step 116*e* between portions 116*a* and 116*b*. Each side wall 116 also has stacking lugs 116*f* on its top surface and stacking recesses 116*g* in its bottom surface. The bottom surfaces of base 112 and side walls 116 should have teeth or lugs (not shown) which should be large enough to prevent slipping if the tray is used on ice or snow, yet small enough to support the tray without breaking if the tray is used on pavement.

At the front end of base 112 is front wall or step 118. Two chain element holders 119, each with a slot 120, are mounted at opposite sides of tray 110 on either base 112 or side wall 116 so that if necessary they may be readily detached, moved forward or rearward, and reattached in the optimum position to accommodate the cross chain length of the particular tire chain being installed. Between front wall 118 and rear wall 114 are front vehicle support 122, center vehicle support 124, and rear vehicle support 126. Front vehicle support 122 has center portion 122*a*, left portion 122*b*, and right portion 122*c*, which are separated respectively by groove 122*d* and channel 122*e* and define signal-initiating device recess 128. Rear vehicle support 126 is relatively close to walls 116 at its maximum width, which is toward the front of the tray, and has rearward-facing concave surfaces 126*a*. Similarly, center vehicle support 124 is relatively close to walls 116 at its maximum width, which is toward the rear of the tray, and has forward-facing concave surfaces 124*a*.

The front and rear walls 118, 114 and the supports 122, 124, 126 define front transverse channel 130, second transverse channel 132, third transverse channel 134, and rear transverse channel 136. Rear channel 136 is approximately aligned with step 116*d* in side wall 116. Longitudinal channels 138 extend between supports 122, 124, 126 and side walls 116. To the rear of rear support 126 are two interior walls 140. Each interior wall 140 has web 140*a* between inwardly facing flanges 140*b* and 140*c*. Chain well 142 is the generally bell-shaped area defined by interior walls 140, rear support 126 (including concave surfaces 126*a*), and side walls 116, and includes rear transverse channel 136. To the rear and sides of interior walls 140 is U-shaped tool compartment 144, which straddles chain well 142, with a portion of chain well 142 being situated between the legs of the "U". Interior walls 140 are mounted on base 112 so that if necessary they may be readily detached, moved laterally, and reattached in the optimum position to correspond to the width of the particular U-shaped tool 10 being used.

Figure 26:
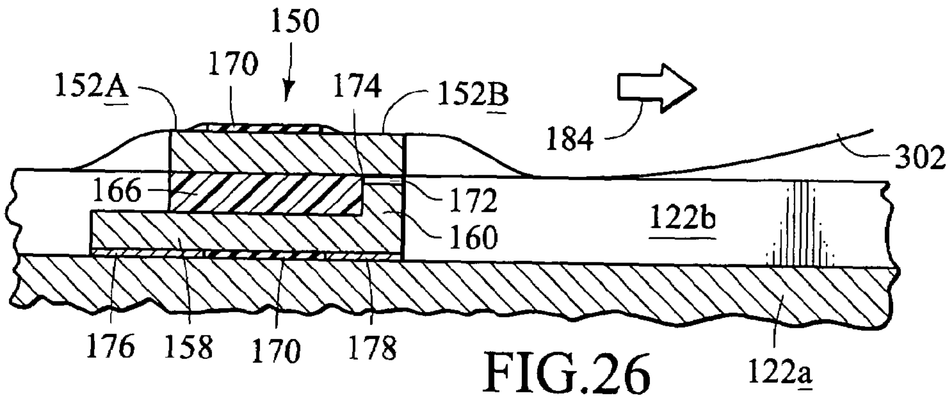
FIG. 26 is an enlarged, fragmentary section of FIG. 22 taken at 26—26 with the leading edge of a tire moving to the right just having passed over the switch, which is in an open position.
Figure 27:
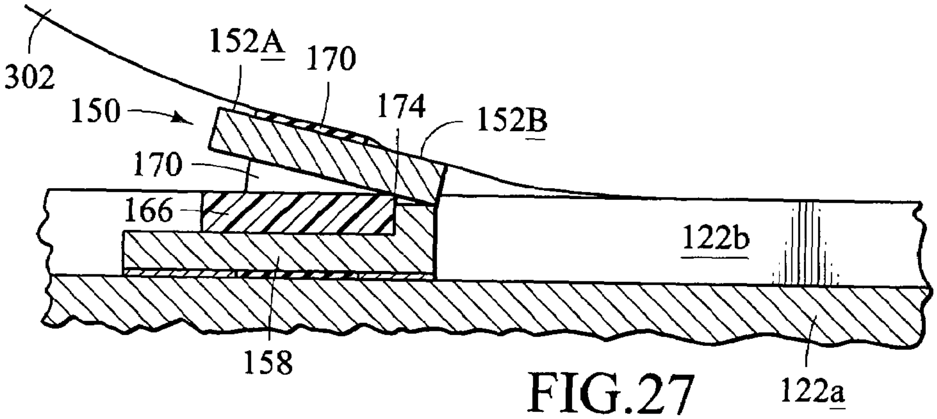
FIG. 27 is a view similar to FIG. 26 with the trailing edge of the tire almost having passed over the switch, which is in a closed position.

As shown in FIGS. 22–28 as well as in FIGS. 17–21, switch 150, which is supported in signal-initiating device recess 128 by front support center portion 122*a*, comprises top, rocking element 152 and stationary, bottom element 158. Top element 152 has front bearing surface 152A, rear bearing surface 152B, and terminal 154. Stationary bottom element 158 has contact posts 160, terminal 162, fastening flange 163 with holes 164, and guide legs 165. The two elements are made of metal or other electrically conducting material. Top element 152 is spaced from bottom element 158 by rigid platform 166 and resilient pad 168, both of which are non-conducting. The components of switch 150 are held together by adhesive and a resilient compression band 170 (depicted by phantom lines) surrounding top element 152 and bottom element 158 and passing between guide legs 165. Top element 152 is not secured to platform 166, but is urged against it by band 170 when switch 150 is in a condition of repose. There is a small gap 172 between each post 160 and the bottom of top element 152. In the absence of a countervailing downward force on front bearing surface 152A, a downward force on rear bearing surface 152B causes top element 152 to rock about fulcrum 174 at the rear of rigid platform 166, against the forces applied by compressed pad 168 and tensioned band 170, until gap 172 is closed and posts 160 contact top element 152, as shown in FIG. 27.

Switch 150 rests on the bottom portion of resilient compression band 170 and on shims 176, 178, and is secured to front support center portion 122*a* by fasteners (not shown) extending through connecting flange holes 164. Terminal 162 and guide legs 165 embrace center portion 122*a* on its left and right sides, respectively, so that switch 150, when it is not so secured, may be slid forward and rearward in recess 128. Switch top element 152 extends out of recess 128 and above the top surface of front support 122. Thus, switch 150 is situated within, and protected by, front support 122.

Two insulated electrical wires (not shown) are connected to terminals 154, 162, extend into channel 122*e*, and then extend through base 112 to two pairs of terminals 180 at the outside of side walls 116; an audio or d.c. power jack may be substituted for each pair of terminals. Alternatively, the wires may extend from channel 122*e* to compartment 184 within front support portion 122*c*. As will be described later, compartment 184 may contain a sending device (not shown) for either emitting a signal similar to those used in remote keyless entry systems for automobiles or emitting an audible sound, preferably a continuous sound. The wires within channel 122*e* are loose and sufficiently slack that switch 150 may be slid forward or rearward to any position along the axis of recess 128 while the wires remain within channel 122*e*.

Figure 29:
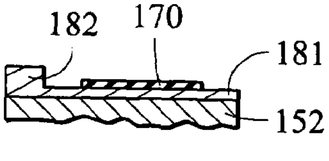
FIG. 29 is a fragmentary view of FIG. 26 showing an alternative embodiment wherein there is disposed on the top surface of the switch an adapter whose elevated portion is toward the front of the tray.
Figure 30:
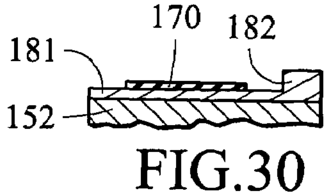
FIG. 30 is a view similar to FIG. 29 with the elevated portion of the adapter toward the rear of the tray.

The profile of the top surface of switch 150 may be varied by adapter 181 with projection 182. As shown in FIGS. 29 and 30, adapter 181 may be retained on top element 152 by resilient compression band 170, with projection 182 either toward the front of the tray or toward the rear of the tray, respectively.

The function of switch 150 is best understood by recognizing that this function could also be performed, at least in theory, by a combination of two separate conventional switches—a normally closed momentary switch at 152A and a normally open momentary switch at 152B—wired so that a circuit is closed when, and only when, there is a downward force at 152B but not at 152A. Switch 150 is preferred over multiple conventional switches because it is simple and durable and thus well suited for its present application, as will become apparent when use of the invention is described later.

Figure 38:
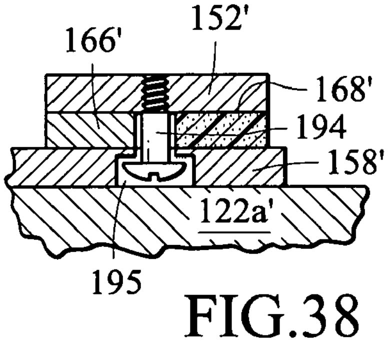
FIG. 38 is an enlarged, fragmentary section of FIG. 34 taken at 38—38.
Figure 39:
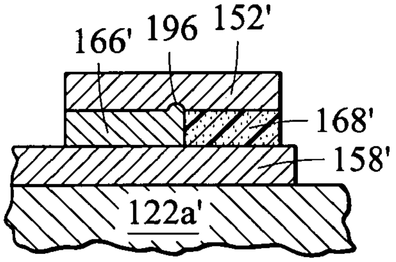
FIG. 39 is an enlarged, fragmentary section of FIG. 34 taken at 39—39.

FIGS. 34–39 show an embodiment of the switch system in which front support center portion 122*a*' abuts front support left and right portions 122_b_, 122_c_ and has horizontal, rectangular contact bars 190 recessed in its top surface. Wires (not shown) extending through base 112 connect contact bars 190 to terminals 180 or jacks, as shown generally in FIG. 17. Switch 150' comprises top, rocking element 152' and stationary bottom element 158'. Top element 152' has the general shape of a four-legged footstool, with front legs 191 and rear, contact legs 192. Stationary bottom element 158' has four passages 193 which receive legs 191, 192. Bottom element 158' includes downwardly extending guide legs 165' and fastening flange 163', which has mounting hole 164'. Top element 152' is spaced from bottom element 158' by, and is adhesively bonded or otherwise secured to, rigid platform 166' and resilient pad 168'. Compression springs may be substituted for resilient pad 168'. As shown in FIG. 38, top element 152' is held loosely in place by retaining screw 194, which is threaded into top element 152' with its head in counterbore 195 in bottom element 158'. Top element 152' is made of metal or other electrically conducting material, or at least is electrically conductive between rear legs 192, while the remainder of switch 150' may be made of either conducting or nonconducting material. A fastener (not shown) extending through mounting hole 164' secures switch 150' to front support center portion 122_a_'. Guide legs 165' embrace center portion 122_a_' to permit switch 150' to be slid forward and rearward along its top surface, within recess 128, when the fastener is removed from mounting hole 164'. Switch top element 152' extends out of recess 128. Legs 191, 192 are spaced from contact bars 190 by small gaps 172'. When a downward force bears on rear bearing surface 152B' of top element 152' but not on its front bearing surface 152A', top element 152' rocks about fulcrum 174 against the force applied by compressed pad 168', until gaps 172' between rear legs 192 and contact bars 190 are closed and rear legs 192 come into contact with contact bars 190. This closes an electrical path between paired terminals 180. Leg-receiving passages 193 should have shapes and clearances with legs 191, 192 which permit free rotation of top element 152' about fulcrum 174 while preventing unnecessary horizontal movement of top element 152' relative to bottom element 158'. In addition, or as an alternative, the top rear edge of rigid platform 166' may have, adjacent to and aligned with fulcrum 174, tongue 196 disposed in a groove in the bottom surface of top element 152', as shown in FIG. 39. In order to reduce the length of switch 150', fastening flange 163' can be eliminated and bottom element 158' secured to the front support center portion in another manner. (Such a length reduction is advantageous because it allows the front support to be shortened without changing the longitudinal distance over which the switch may be mounted on the center portion.) For example, a countersunk hole for a mounting screw may be provided through rigid platform 166' and bottom element 158', with an access hole through top element 152'. Alternatively, the portion of the bottom element engaging the front support center portion may be replaced by a separate plate removably connected by screws to the remaining, upper portion of the bottom element, in such a manner that the plate may be reversed 180° with respect to the remaining portion, thereby enabling the mounting hole to be positioned either at the front or the rear of the bottom element, as desired. In order to avoid increasing the height of the fulcrum, such a plate could be disposed entirely within a longitudinal groove in the top surface of the front support center portion.

As another alternative, tongue 196 may be replaced by a spindle, for example a dowel pin, which pivotally connects the top element and the bottom element, by extending through holes in upturned flanges at the side edges of the bottom element and corresponding holes in downturned flanges at the side edges of the top element. This pivotal connection eliminates the need for front legs 191, retaining screw 194, and the positioning function of rear legs 192. To enhance the weather-resistance of the switch, the top element may also have downwardly extending walls at its front and rear edges, generally in the planes of the legs shown in FIG. 35, so that the walls form with the side flanges a rectangular skirt which at least partially surrounds the bottom element.

As another alternative, a third, parallel contact bar may be provided in a center recess in front support center portion 122_a_', a corresponding third rear leg provided at the center of top element 152', and the three contact bars wired so that the electrical path will be closed when the top element makes contact with the center contact bar and either of the side contact bars. To ensure good electrical contact, a resilient pad may be disposed in the center recess beneath the center contact bar, thereby elevating the center contact bar slightly higher than the side contact bars when the center rear leg is not bearing on it.

Except for the differences just described, switches 150 and 150' are very similar in design and function and respond in the same manner to downward forces on the front and rear bearing surfaces of the top, rocking element. Switch 150' is preferred because it eliminates the need for loose wires, is simpler and sturdier, and does not require wires to be connected to the switch. The description of the invention hereinafter will refer primarily to switch 150, but it will be understood that the description also applies to switch 150' unless otherwise stated.

Loading the Tray

The tire chain is loaded into tray 110 in its proper orientation and connected to tool 10, as shown in the right hand side of FIG. 17, which depicts ladder-type tire chain 210 having inner side chain 212, a corresponding outer side chain (not shown in FIG. 17) in left longitudinal channel 138, twist-link cross chains 216, fastening hooks comprising inner hook 212H and outer hook 214H, and fastening links comprising inner link 212L and outer link 214L. (Outer side chain 214, outer hook 214H and outer link 214L are shown in the upper portions of FIGS. 32 and 33.) Preferably this loading is done ahead of time, at a time and place and under conditions chosen by the user for his or her convenience, comfort, and safety.

To load the tray, the tire chain is preferably laid out on a flat surface with the hooks which connect the cross chains to the side chains facing down. Since twisted chain is a frequent cause of tire chain failure, twists should be removed until each side chain is in a relaxed state. If a side chain is not relaxed at a cross chain hook, it can be untwisted by threading the end of the side chain behind the cross chain. This is repeated until the tire chain is completely relaxed.

Figure 31:
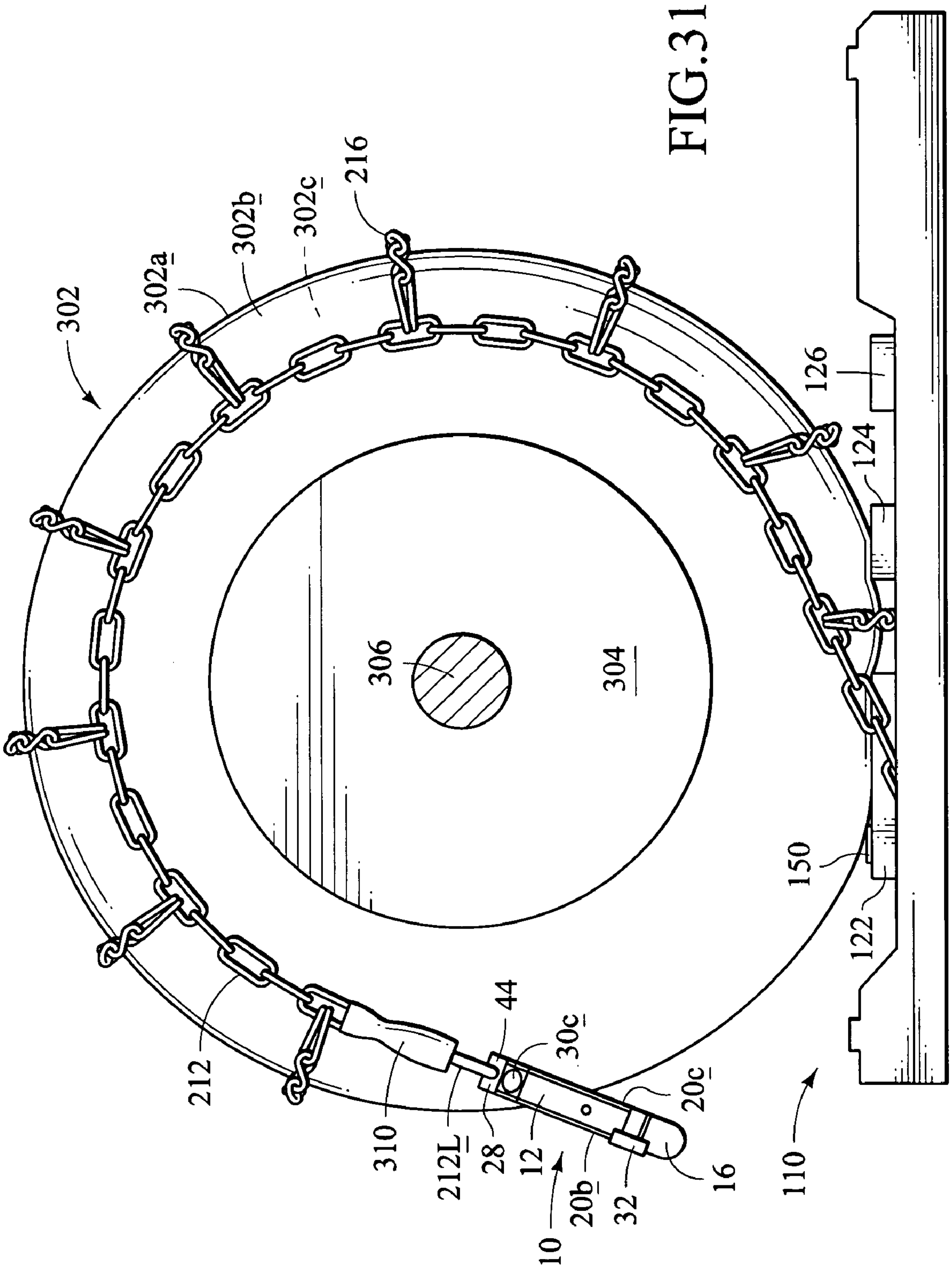
FIG. 31 is an side elevational section view, taken vertically through the axle, of the inside of a wheel resting on a tray with the tool connected to a partially installed chain.

Next, tool 10 is connected to the fastening elements of the side chains at one end of the tire chain. With the tool oriented so that latches 32, 70 are facing down, inner arm 12 will be connected to the side chain which has the open hook, and outer arm 14 will be connected to the side chain which has the locking hook. The connection will be made to the appropriate end of the tire chain—either the end with the hooks or the other end, where the fastening elements are links. If the tool is being connected to the link end, it will be connected to the link which will be eventually connected to the hook when the tire chain is installed, which may not be the endmost link. I recommend pulling each chosen fastening link through a short resilient sleeve, such as narrow bicycle inner tube 310 as shown in FIG. 31, so that the sleeve (not shown in FIG. 17) covers the side chain from the last cross chain to about one-fourth of the chosen link. (This isolates the chosen link from the rest of the links, provides some rigidity to the endmost links, makes the endmost links easier to handle, and reduces hand-to-metal contact. Also, if the chosen link is not the endmost link, it also avoids the disadvantages of cutting the excess side chain link(s) or merely wiring or tying them to the side chain. Sleeve 310 can be made more rigid, as for example by making it from, or using it inside of another sleeve made of, a material having a greater wall thickness, such as rubber hose or plastic tubing, thereby making the end of the side chain easier to handle, which is an advantage not only in the fastening of the chain elements but also in the unfastening of them when the tire chains are removed. Also, a similar sleeve or sleeves may be used as well on the end of the side chain with the mating fastening hook, and the sleeve(s) may be extended past the side chain(s) to provide rigidity over a greater length of side chain, as for example by lengthwise slitting and circumferential taping of the sleeve.)

Figure 33:
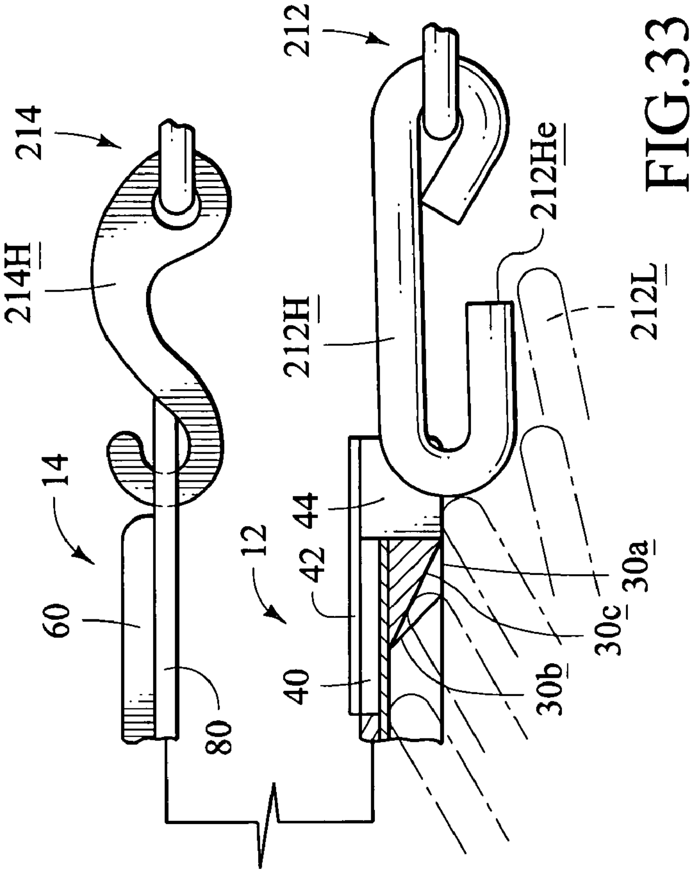
FIG. 33 is a fragmentary view of the tool consisting of a section of the inner arm taken at 8—8 in FIG. 2 and a plan view of the end of the outer arm, with the arms connected to chain hooks.
Figure 32:
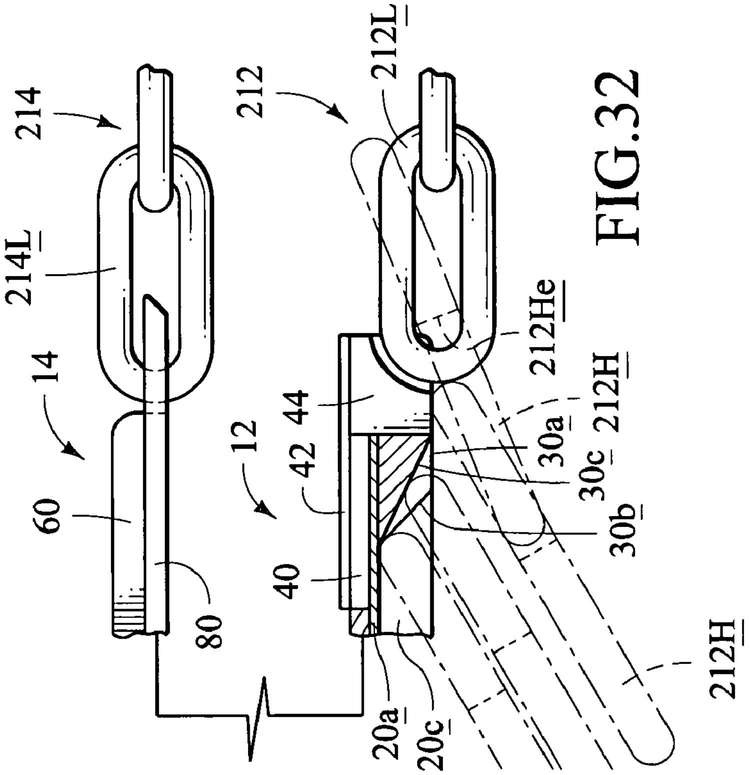
FIG. 32 is a fragmentary view of the tool consisting of a section of the inner arm taken at 8—8 in FIG. 2 and a plan view of the end of the outer arm, with the arms connected to chain links.
Figure 34:
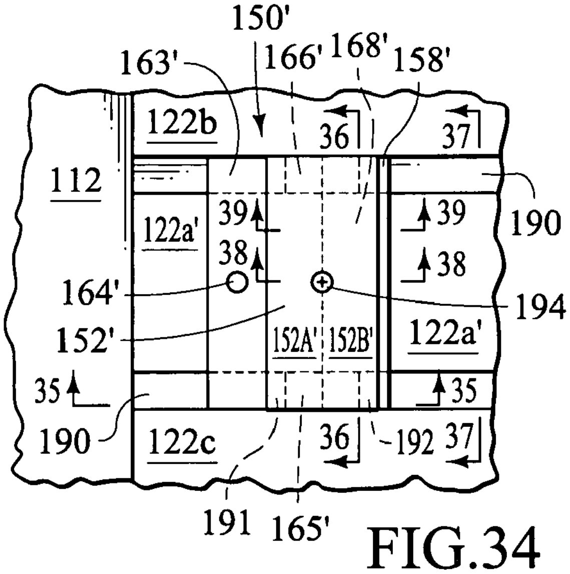
FIG. 34 is an enlarged, fragmentary view of another embodiment of the switch shown in FIG. 17.
Figure 35:
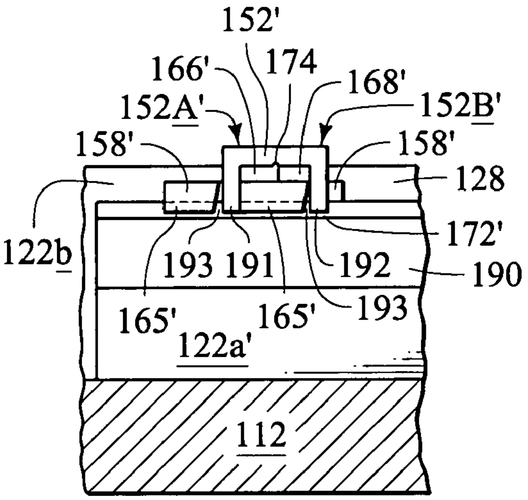
FIG. 35 is a section of FIG. 34 taken at 35—35.
Figure 36:
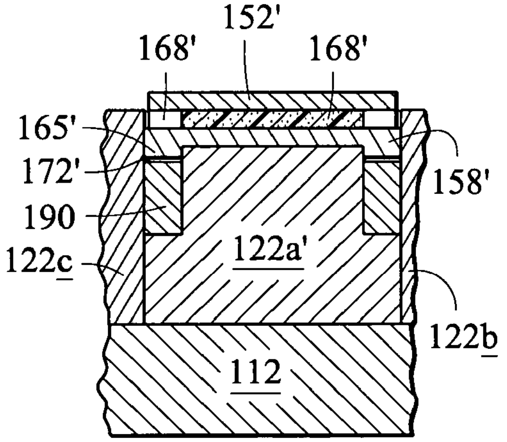
FIG. 36 is a section of FIG. 34 taken at 36—36.
Figure 37:
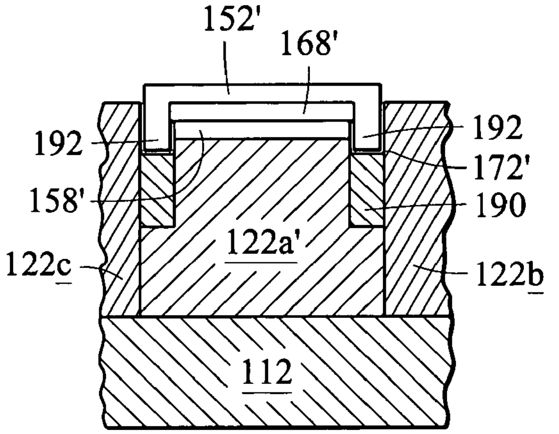
FIG. 37 is a section of FIG. 34 taken at 37—37.

To connect inner arm 12, claws 28, 44 are separated to the open position, the inner fastening element (link or open hook) is placed in groove 44*a*, the claws are closed together by squeezing top claw holder 26 and bottom claw holder 42, and latch 32 is moved to the latched position; see the lower portions of FIG. 32 or 33, disregarding the phantom lines for the moment.

At this point the relationship between the fastening element and claws 28, 44 should be noted, since it provides advantages when the tire chain is stored, handled, and installed. A small portion of the fastening element (a quarter-circular arc at one end) is securely but releasably confined within the passage formed by grooves 28*a*, 44*a*, with nibs 28*b*, 44*b* wrapping around the curved portion of the fastening element and projecting into the interior space within the fastening element; the remainder of the fastening element is exposed. The claws occupy very little of the interior space within the fastening element (approximately 2 percent). This is sufficient to positively and securely confine the fastening element, so long as the claws and their supporting structure are made of a material which is relatively rigid and non-resilient. The fastening element cannot rotate about its longitudinal axis (as it would be able to do, for example, if the clasp mechanisms were swiveled for rotation about the longitudinal axis of tool arm 20), and cannot move longitudinally or transversely with respect to tool arm 20. Although it can rotate about a vertical axis, this is not a problem when the connection of the fastening element of the side chain is being made, since pulling the chain with the tool fixes its rotational orientation to the optimum position. It can be a consideration before that, however, when (1) the fastening element is an open hook such as hook 212H shown in FIG. 33, and (2) there is little or no tension on the chain, as is the case during storage, handling, and installation prior to connection, because the hook should not be permitted to rotate out of the claws (i.e., by hook rotation which is clockwise as shown in FIG. 33).

The particular metal thickness of open hook 212H and the passage size illustrated in FIG. 33 (both are approximately 0.250 in. diameter) and the length of the straight portion at hook end 212He (approximately 0.750 in.) prevent such rotation, but it is desirable for the tool to be able to accommodate open hooks of different sizes and configurations. Typically open hook thicknesses range from about 0.250 in. for standard tire chains and about 0.165 in. for low clearance, Class “S” tire chains. Claws 28, 44 shown in the lower portions of FIGS. 32 and 33 have been found satisfactory for these typical open hooks, but it may be necessary to make modifications to enable them to accommodate greater thickness ranges and/or different configurations of other open hooks. One such modification would be to extend the claws, and the passage they define, in a straight line slightly away from, and parallel to the longitudinal axis of, the tool (to the right as shown in FIG. 33), so that the extended nib of the claws inside the hook restrains the hook from rotation. A second such modification would be to add to each claw a small pin or screw that obstructs a portion of the passage when the tool is being used with a hook whose metal diameter is substantially less than the diameter of the passage, for example two opposed, conically tipped set screws lying on a vertical axis at the edge of the passage nearest the center of each claw (i.e., at the midpoint of the longer quarter-circular broken line at the lower left corner of FIG. 1). A third such modification would be to change the hook itself by extending the straight portion at the end of the hook so that it cannot pass through the passage.

To complete the connection sequence, outer arm 14 is connected to the outer fastening element (link or locking hook) in a manner similar to inner arm 12, as shown in the upper portion of FIG. 32 or 33, and latch 70 is latched. Hanger 76 is pivoted against handle 16 so that it is directly beneath latch 70.

Claws 64, 82 shown in the upper portions of FIGS. 32 and 33 have been found satisfactory for typical locking hooks, such as locking hook 214H, but as with claws 28, 44 it may be necessary to make modifications to enable them to accommodate hooks of different sizes and configurations. Possible modifications include increasing the height and/or length of the claws, and to either change the configuration of the circular passage or add additional openings near the circular passage to create one or more additional passages of different configuration.

Now that tool 10 is connected to the tire chain, a minor portion (approximately one-third) of the tire chain at the end remote from the handle is picked up and moved laterally onto tray 110, with the hooks of the cross chains still facing down and with the cross chain farthest from tool 10 fitting into front transverse channel 130. The remaining, major portion (approximately two-thirds) of the tire chain is raised by tool 10 to a vertical position, in which it is suspended and unsupported, and then lowered and laid down in a Z-folded fashion to fill chain well 142, with the cross chains remaining more or less perpendicular to the longitudinal axis of tray 110 and close together, and the side chains piling up to fill in the cavities. Tool 10 is placed in tool compartment 144. If necessary the chain in chain well 142 is then spread so that it is not piled above rear wall 114 and side walls 116. At the front end of tray 110, the links next to the fastening element at the other end of the tire chain are placed in slots 120, which fixes that end of the tire chain with the fastening elements exposed. The tire chain is now laid out in the tray as shown in the right side of FIG. 17, with the walls of the tray and the supports confining the tool and the various elements of the tire chain so that they remain oriented and cannot become commingled. Tool inner arm 12 is connected to inner fastening link 212L and, as shown in FIGS. 32 and 33, tool outer arm 14 is connected to outer fastening link 214L. Inner fastening hook 212H (shown in FIGS. 32 and 33) and outer fastening hook 214H are held just forward of slots 120.

Of course, while loading the tray has been described with the tire chain being arranged in the tray after being connected to the tool, this sequence may be reversed.

Next, the foregoing is repeated, with the other tire chain being connected to the other tool 10 of the pair and placed in a second tray 110. It should be noted that if the two tire chains are identical, the tool will be connected to the fastening hooks of the second tire chain, and the fastening links of the second tire chain will be just in front of slots 120 (not shown). On the other hand, if the second tire chain is a mirror image of the first (i.e., the first tire chain and the second tire chain are identical, except that the open hook and the locking hook are reversed), the tool will be connected to the same kind of fastening elements (either links or hooks) on both tire chains. In this case it probably will be preferable to connect the tool to the hooks (as shown in FIG. 33) rather than the links (as shown in FIG. 32), because connecting the ends of the side chain during installation, which will be described later, becomes slightly easier. In either case the connection of the fastening hooks to tool 10 keeps the hooks from snagging on another portion of the tire chain during storage, handling, and installation.

If the two trays are being used as a pair, with tires being driven onto both trays simultaneously, a switch 150 is required for only one tray, which should be the tray on the driver's side of the vehicle.

Storing the Loaded Tray

The loaded trays are stored by stacking one on the other, with stacking lugs 116*f* of the lower tray fitting into stacking recesses 116*g* of the upper tray. They can be stored indoors or in the vehicle ready for use, preferably with other loaded trays, so that even if a set of tire chains which have been installed are removed because of bare pavement, a fresh set of tire chains can be installed as necessary without having to re-load the removed set of tire chains back into their trays.

Installing the Tire Chains

To install the tire chains, front lip 113 of the front end of each of the loaded trays is butted against a drive wheel tire with the longitudinal axis of each tray in the center of the path of the tire. The trays may be placed ahead of the tire and the vehicle driven in low gear onto them, in which case the connections between the ends of the side chain will occur behind the tire (i.e., toward the vehicle's backup lights). Alternatively, the trays may be placed behind the tire and the vehicle driven in reverse onto them, in which case those connections will occur ahead of the tire (i.e., toward the vehicle's headlights). The user will determine which, based on the design of the particular vehicle and possibly other circumstances, as will be described later in the discussion of setup.

Figure 28:
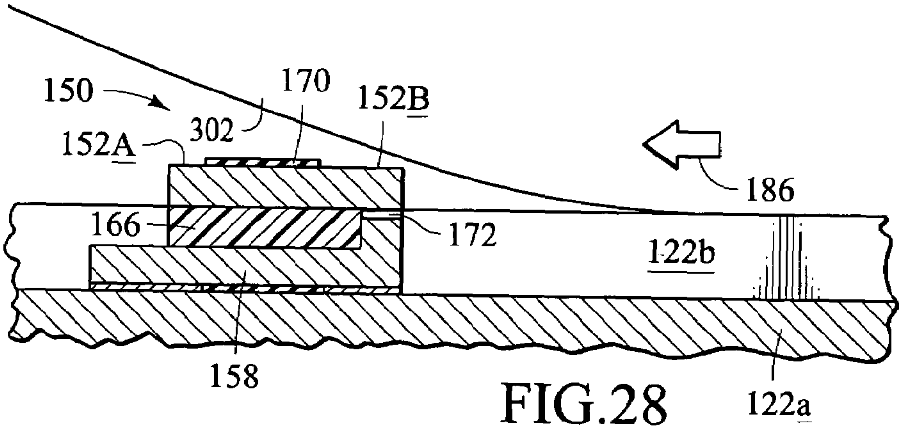
FIG. 28 is a view similar to FIGS. 26 and 27 with the trailing edge of the tire just having passed over the switch, which is in an open position.

The vehicle is driven slowly in a straight line onto the tray so that the tire climbs over front wall 118 and onto front support 122. The tire then passes onto switch 150, which has been secured to support 122 as previously described in the description of the tray, in a specific forward-and-rearward position predetermined in a manner which will be described later in the discussion of setup. As shown in FIG. 26, the tire 302 is exerting a downward force on both front bearing surface 152A and rear bearing surface 152B of top element 152, so that switch 150, which is within the footprint of the tire, remains open. The tire continues over switch 150 in the direction indicated by arrow 184 until the trailing edge of the tire lifts off bearing surface 152A, while still exerting a downward force on bearing surface 152B. This causes top element 152 to rock about fulcrum 174, so that the switch closes, as shown in FIG. 27. The contact surface of top element 152 which was adjacent gap 172 is driven by the weight of the vehicle downward against the contact surfaces of posts 160 of bottom element 158, which tends to breach any oxide layer on the contact surfaces and otherwise creates a firm electrical contact. The closing of the switch initiates a visual or audible signal to the driver, signalling the driver to apply the brakes and stop the vehicle. If, after the vehicle is stopped, the signal continues, the driver knows that the tire is in the correct position. (The nature of the signal will be discussed in detail later.) If, on the other hand, the driver does not stop the vehicle in time, and allows the movement of the vehicle to continue until the trailing edge of the tire no longer contact bearing surface 152B, resilient pad 168 and resilient compression band 170 cause the switch to resume the open position as shown in FIG. 28, and the signal ceases. In that event the driver will drive the vehicle in the opposite direction (i.e., in the direction of arrow 186), whereby the switch will close again as shown in FIG. 27 as the vehicle is driven, and stop the vehicle when the signal begins again. If the driver overshoots again, he will move the vehicle in the opposite direction and continue the process—forward, reverse, and so on—until the signal continues after the vehicle is stopped.

Tests have shown, however, that the tire can be positioned quite accurately and quickly with respect to the vehicle supports, with only a limited number of attempts. The continuous feedback of the signal tells the driver not only when the tire is in the correct position, but also informs the driver of the length of the correct zone and therefore of the appropriate balance of throttle pressure, braking reflex, and braking force. Typically a driver, after the experience of one or two successful stops, will stop in the correct position on the next first attempt.

More fundamentally, the ability to sense and signal whether or not the tire is within a small zone on the tray is superior to the ability to merely sense and signal whether or not the tire has passed a point on the tray. The former provides two limits. The latter provides only one, and hence cannot eliminate variables such as vehicle speed, throttle pressure, throttle reaction time, braking reaction time, variations in these from driver to driver, and variations produced by external conditions such as grade, road surface, and the presence of snow or ice.

Adapter 181 may be employed as desired to shorten or lengthen this sensing and signalling zone by changing the effective profile of the top surface of switch 150. In the position shown in FIG. 29, with the maximum height of the switch surface toward the front of the tray, adapter 181 shortens the zone. (It can be seen from FIG. 28 that if a projection were to extend upward from surface 152A for a distance greater than the distance to the tire, the tire could not contact surface 152B and the zone would be in effect reduced to zero.) On the other hand, in the position shown in FIG. 30, with the maximum height of the switch surface toward the rear of the tray, adapter 181 lengthens the zone by causing switch 150 to close sooner. As an alternative to the adapter, the signalling zone may be shortened or lengthened by varying the distance by which the top surface of top element 152 projects above the plane of the top surface of front support left and right portions 122*b*, 122*c*, as for example by shims between center section 122*a* and base 112.

Of course, as an alternative to the switch, the user may simply rely upon instructions or signals from a spotter observing the tire and tray from outside the vehicle, or may use a trial-and-error method in which the user stops and leaves the vehicle to observe.

If the vehicle is driven too far toward the rear of tray 110 or is inadvertently driven in the wrong direction, interior walls 140 and exterior walls 114, 116 will protect tool 10 from damage due to the weight of the vehicle bearing on it. In addition to preventing the tire from contacting tool 10, interior walls 140 keep chain in well 142 from spilling or being displaced onto the top of tool 10 and then damaging the tool when the tire is driven onto this overlying chain.

Now, with the vehicle stopped, the emergency brake applied, and the engine turned off, the user begins the draping operation by grasping the handle of the tool, removing it from the tray, picking it up with the unsupported chain to which it is connected suspended from it, and then drawing the tool, with the chain trailing it, upward and circumferentially around the tire, so that the chain slides over the surface of the tire and is supported by and guided along the tire in a circular arc about the axis of rotation of the wheel. In order to prevent the cross chains from snagging on the edges of the tread, as is likely to occur at side lugs on the tread when the tires are snow tires, the user may initially keep the tire chain on the top of the tread. This is accomplished by using the hand which is holding tool 10 to bend handle 16 at hinge 90 so that handle 16 and arms 12, 14 form a diamond shape, with inner arm claws 28, 44 and outer arm claws 64, 82 and the chain connected to them coming together and contacting each other. As that hand draws tool 10 circumferentially around the tire, the cupped other hand is used as a guide to keep the trailing chain on the tread. This is continued until the side chains become taut, which will occur when the claws are slightly past the vertical. Then the user allows the tool to resume its normal "U" shape and brings the side chains down on the sidewalls. If the user elects not to keep the tire chain on the tread in this manner, as he or she probably would elect if the tires have no lugs at the edges of the tread where the tread and the sidewalls intersect, the cross chains will be guided along the tread and sidewalls, and the side chains will be guided along the sidewalls, as the tool is drawn around the tire in a straddling position.

The user tensions the side chains and cross chains by pulling on handle 16 while eliminating any snags and local twists with the other hand. During the draping operation claws 28, 44 and 64, 82 have continued to confine their respective fastening elements to which they are connected, notwithstanding the pulling forces exerted on them through adjacent chain links by gravity, dragging the chain over the surface of the tire, and tensioning the side chains. This completes the draping operation, during which the flexibility of handle 16 provided by the resilient hose has helped to prevent tool 10 from hanging up on the body of the vehicle. The result is depicted in FIG. 31, which shows tire 302 mounted on rim 304 driven by axle 306, and tool 10 connected to the fastening elements of the side chains. Tire 302 has tread 302*a*, inner sidewall 302*b*, and outer sidewall 302*c*. Handle 16 is now bridging the tread of tire 302, with the arms extending along opposite sidewalls. Claws 28, 44 of inner arm 12 are connected to inner fastening link 212L of inner side chain 212. Resilient sleeve 310 isolates fastening link 212L, as previously mentioned with respect to loading the tray. The user (not shown) is standing on the side of the wheel away from the viewer, facing the viewer and the outer sidewall and holding handle 16 with his or her right hand much the same way as one would hold the body of a hardshell crab to avoid being pinched by the crab's claws.

Next, the outer fastening element on the free end of the tire chain lying in the front of the tray is picked up and hung loosely on the outer fastening element connected to the tool. Alternatively, hanger 76 may be pivoted away from handle 16 and the free outer fastening element hung on hook 77. This reduces the weight of the free chain which the user must soon support when picking up and handling the inner fastening element and keeps the tire chain from inadvertently being allowed to fall behind the wheel.

FIGS. 32 and 33 show what happens next for both cases—when tool 10 is connected to links and when it is connected to hooks, respectively. The user picks up the free inner fastening element (or the sleeve surrounding the side chain links between it and the nearest cross chain) from the tray and brings it up into the concave channel formed by flanges 20*b*, 20*c* and web 20*a* of member 20 of inner arm 12. Using the flanges 20*b*, 20*c* as a guide, the user slides the free fastening element (212L or 212H) toward the claws. When the fastening element contacts concave inclined surface 30*c*, the user, feeling that it is close to the claws, moves it along that surface, whose concavity centers the fastening element as it approaches the claws. The fastening element (212L or 212H) leaves surface 30*c* and moves the remaining distance to the mating fastening element connected to the claws. As shown in FIG. 32, when the connected fastening element is link 212L, mating hook 212H passes above link 212L (out of the longitudinal axis of arm 12), remaining in contact with link 212L, until the end 212He of hook 212H is within the interior of link 212L. Then hook 212H is withdrawn into its position of final engagement with link 212L, which is conventional (not shown). The necessary passage of hook 212H over link 212L with adequate clearance is possible because of the relatively small portions of the link and its interior space which are obstructed by the claws, as previously described with respect to loading the tray. As shown in FIG. 33, when the connected fastening element is hook 212H, link 212L remains on the longitudinal axis of arm 12, rides over (away from the tire) the end 212He of hook 212H, and is withdrawn to its conventional position of final engagement (not shown). This fully connects the inner side chain. At this point the user unlatches latch 32 and squeezes the top surface of latch top panel 32*b* and the bottom surface of grip bottom panel 56*b* as previously described, opening claws 28, 44 and releasing the fastening element 212L or 212H from inner arm 12. This fully disconnects inner arm 12 from the inner side chain. It will be appreciated that latch 32 is a component which performs multiple functions. When latched, it locks the clasp mechanism provided by claws 28, 44 in the closed, confining configuration shown in FIG. 2. When unlatched, it allows the clasp mechanism to move to the open, releasing configuration shown in FIG. 3 and provides a surface for the force applied by the user to actuate the clasp mechanism by moving it to that releasing configuration. As can be seen in FIG. 3, the open configuration of the claws allows the fastening element to move out of the passage and past the adjacent projections without substantial movement of the fastening element toward the handle and provides for the immediate, complete, and clean release of the fastening element.

The user then unhooks the fastening element (214L or 214H) from its hanging position previously described and connects and locks it securely to the mating outer fastening element (214H or 214L) connected to tool 10. This fully connects the outer side chain. At this point the user unlatches latch 70 and squeezes the top surface of latch top panel 70*b* and the bottom surface of hanger grip bottom panel 76*b* as previously described, opening claws 64, 82 and releasing the fastening element 214L or 214H from outer arm 14. This fully disconnects outer arm 14 from the outer side chain. As can be seen in FIG. 5, the open configuration of the claws provides for the immediate, complete, and clean release of the fastening element.

It will be understood that while it is advantageous to connect the inner and/or outer fastening element and the respective mating element before the fastening element has been released from the claws, as shown in FIGS. 32 and 33 and just described, the user may elect to reverse the sequence and release the fastening element from the claws first and then connect the two fastening elements without using the inner arm as a guide.

The other tire chain is installed on the other driving wheel in a similar manner, after which the tools and empty trays are stored and the vehicle is driven off the tray in the opposite direction, so that it goes back over the front of the tray. If the vehicle is inadvertently driven in the wrong direction and passes over rear wall 114 of tray 110, the tray will not be damaged.

As previously mentioned in the summary of the invention, the tire chains can be installed in most cases without the need for the user to see the inner fastening elements being connected or to hold them with both hands simultaneously, which often has required the user to lie on the ground when installing tire chains in the conventional manner. There are several reasons. First, the user knows that the tool has prevented the side chain from twisting during storage, handling, or installation, since one end of the tire chain is still connected to the tool, the other end is still held by the chain element holder, neither clasp mechanism can rotate about the longitudinal axis of its arm, and the tool cannot be rotated about the axis of the handle, as could be possible with a more flexible or differently configured tool. Second, the tool positively fixes the location of the connected fastening element. Third, the tool guides the free fastening element into contact and engagement with the connected fastening element. Fourth, the tool prevents the connected fastening element from moving or rotating away from the free fastening element in response to pressure from it. Fifth, if the tool is connected to a fastening hook, the tool prevents the hook from snagging on another portion of the tire chain.

In addition, the invention eliminates the need for the user to have both hands holding the mating inner fastening elements at the inner sidewall, which, like the need to see the fastening links, could also require him or her to lie on the ground, since balancing on one's feet may be difficult under these circumstances. Instead, the user is able to see the latches, which are remote from the fastening elements being connected, and to apply tension to the inner side chain through the tool, which one hand (the hand least able to reach the inner sidewall of the tire) is holding by the handle.

Setup

In order to obtain the maximum benefit from the invention, it is important to stop the tire on the tray at the location which will place the fastening elements of the chain in the optimum angular position on the tire when the tire chains are properly tensioned on the sidewalls and the fastening elements are ready to be connected. Predetermining the location of switch 150 on front support 122, as mentioned earlier, allows this optimum connection angle to be achieved.

The optimum connection angle will vary with the design of the particular vehicle. On some vehicles, particularly trucks, buses, graders, and other heavy equipment, clearance may not be a factor, either because the tires are sufficiently spaced from the vehicle's fenders or because there are no fenders at all. For these vehicles the optimum connection angle may be within the range of approximately 45° to 170° from the bottom of the tire, in the direction away from chain well 142. An angle less than approximately 45° will place the fastening elements so close to the ground that arms 12, 14 of tool 10 cannot come close enough to the tangent of the side chain circle to enable inner arm 12 to properly guide the free fastening element to the mating element connected to the tool. An angle greater than 170° will prevent the chain from being properly draped on the tire. Within the range of 45° to 170°, the less the angle, the lower the user will have to reach, and if the angle is less than 90°, the farther around behind the tire. At the other end of this range, the greater the angle, the greater the weight of the free end of the chain to be lifted to the height of the connection.

For most other vehicles, including passenger cars, clearance will be a factor, and the connection angle will be limited to the lower angles of that range which place the elements being connected, or at least the handle of the tool and the knuckles of the user's hand gripping it, below the body of the vehicle. As a general rule, the connection should be made at about 90° or, if there is insufficient clearance at 90°, at the lesser connection angle which allows sufficient clearance for the connection to be made.

Unless there is a circumstance restricting movement of the vehicle, the user will have decided in advance whether to drive the vehicle onto the tray in low gear or reverse, based on the design of the body of the vehicle. The presence of mud guards close to the tire may militate for reverse, for example. If the vehicle is a passenger car or light truck with rear wheel drive, it usually will be preferable to drive it in low gear onto the tray. With front wheel drive passenger cars, the preferred practice varies greatly with the design of the front fenders, although these vehicles tend to be more forgiving than rear wheel drive vehicles, since the body is spaced sufficiently far from the front wheel to allow the wheel to turn fully to the right and left. (While the description of the invention has assumed for convenience that the tire chains are being installed on only drive wheels, this is not always the case, it being well known that tire chains may be used on non-drive wheels to enhance braking and steering.) The invention is not intended to be used for a tire which is already stuck.

The length of the sensing and signalling zone and the location of switch 150 should be predetermined for particular tires and tire chains at or before the first time the tire chains are loaded into the tray in anticipation of actual use.

The length of the sensing and signalling zone may be determined by trial and error without having the tire chains in the tray. As a starting point, adapter 181 should not be used, and the top surface of top element 152 should be coplanar with the top surface of front support left and right portions 122*b*, 122*c*, so that top element 152 will be contacted by the part of the tire tread bulging down between front support left and right portions 122*b*, 122*c*. The vehicle is then driven slowly onto the tray until switch 150 closes and then re-opens. The duration and length of the closing should be definite and discernable, but as brief as possible and repeatable. If the zone is too long, a shim under center section 122*a* should be removed or adapter 181 should be installed as shown in FIG. 29. If the zone is too short or there is no signal, a shim should be added or adapter 181 should be installed as shown in FIG. 30.

To locate switch 150, it is detached from support 122 and reattached as far as possible to the rear of support 122. Next, the tray is loaded into the tray as shown in FIG. 17, with the endmost cross chain in front transverse channel 130. The vehicle is then driven onto the tray and stopped when switch 150 is in the closed position shown in FIG. 27. If the resulting connection angle is too great, the vehicle should be driven toward the front end of the tray to produce a lesser angle. If, on the other hand, the resulting connection angle is too small, then the vehicle should be driven off the tray, the tire chain in the tray shifted so that the two endmost cross chains are in front transverse channel 130, and switch 150 moved to a more forward location on support 122. (The length of support 122 is selected so that the range of the possible positioning of switch 150 is roughly equal to the center-to-center spacing of the cross chains, which in the case of the ladder-type chains shown is 5.0 or 5.25 in.) If necessary, more than two cross chains may be placed in channel 130.

In any event, the user should by trial and error position the tire and actually drape the tire chains around the tire and tension them to achieve and confirm both the optimum connection angle and the optimum chain length (generally, as short as possible) and to put sleeves 310 on the ends of the side chains on which the fastening element is a link. Similarly, the optimum chain length should be determined for, and sleeves applied to, the other tire chain of the set and its tire. As mentioned earlier, only the tray on the driver's side will employ a switch. If the two tire chains in the set are identical to each other rather than mirror images of each other, as discussed earlier in the description of the tool, the user needs to take into account the distance, on the tire chain of the pair which will be in the tray without the switch, between the fastening element at the free end of the side chain (i.e., the end in chain element holder 119) and the closest cross chain. If that distance is appreciably longer than the corresponding distance on the tire chain in the tray with the switch, the optimum connection angle to be achieved by the switch should be reduced accordingly.

Next, with the tire at the position which will result in the optimum connection angle, switch 150 should be moved and secured to support 122 so that it contacts the rear profile of the tire, as shown in FIG. 31.

It should be noted that as a practical matter there is some latitude in achieving the optimum connection angle, since the tire chain laid out in the tray can be slid toward the front or rear of the tray after the tire has stopped. Such sliding is limited to the distance between the vehicle supports, which is about 2.25 in. in the embodiment shown in FIG. 17. This equates to a total of approximately 12°, or a tolerance of ±6°, for a typical passenger car tire having a diameter of 24 in. The sliding is limited by the widest portions of supports 124 and 126, which keep the cross chain hooks from sliding past them or becoming stuck between a support 124, 126 and a side wall 116. Before the chains are slid, the cross chain(s) in transverse channel 130 should be placed over the front of support 122; otherwise, a relatively short cross chain may catch on the front surface of support 122 if the tire chain is being slid toward the rear of the tray.

Additional advance preparation will further simplify loading and installation. The chains and tool may be painted or otherwise marked so that the fastening elements and the corresponding tool arm can be quickly identified. I recommend painting the inner fastening elements and tool arms one color and the outer fastening elements and tool arms a contrasting color. Also, to identify and distinguish the side chains, the outer side chain links to which the tensioners will be connected can be painted the outer color.

Signalling the Driver

The selection of the particular means to signal the driver is primarily a function of expense.

An effective and convenient signal is a light on the vehicle's instrument panel which is illuminated when the tire is in the zone. Such a light would be actuated by a remote keyless entry-type device and battery in compartment 184, in accordance with known technology.

Alternatively, an electronic device for emitting an audible sound, could be placed in compartment 184 with a battery, preferably with a manual on-off switch in the circuit with switch 150 so that the user could turn off the sound as soon as he leaves the stopped vehicle, thereby sparing himself and others the annoyance of having to listen to it for an extended period. A chip in the device which automatically turns off the sound at a fixed interval after it begins would serve the same purpose. Suitable piezo and electromagnetic buzzers and sirens are available from Radio Shack, U.S. Electronics, Inc., St. Louis, Mo., and, Kayer Industrial Co., Ltd., Hong Kong.

An inexpensive third alternative is a light wired to one pair of terminals 180 and placed in the driver's view. An example is an ordinary flashlight wired with terminals 180 in parallel with the flashlight's own on-off switch. Alternatively, a jack with an integral normally closed switch can be substituted for terminals 180, in series with the on-off switch. The flashlight can be attached to the driver's front fender with a magnet or, if the tray is at a rear wheel, to the side of vehicle to the rear of the driver and directed to the outside rear view mirror. Such a flashlight can carry its own battery. If the flashlight has plug-in jacks for the wires, it may be used as a normal flashlight when it is not being used with the tray. Examples of flashlights with suitable jacks are the continuity tester flashlights available from Bright Star Industries, Wilkes-Barre, Pa. As an alternative to a magnet, the light can be attached to the windshield or other window glass by a suction cup. Clear suction cups of the type available from Presto Galaxy Suction Cups, Inc, Greenpoint, N.Y. allow an embedded or adjacent L.E.D. or small incandescent lamp to be seen through the suction cup and the glass.

Dimensions

The length of arms 12, 14 should be sufficient to allow the claws to place the fastening links at the widest part of the tire, while the arms are held more or less in alignment with the end links of the side chain and tangent to the side chain circle. This enables the user to pull on handle 16 to properly tension the side chains and cross chains, as mentioned above. On the other hand, the length of arms 12, 14 should be no longer than necessary, to minimize the possibility of interference between the tool and the vehicle and to keep the length of tray 110 to a minimum. I have found that an arm length in the range of from 4 to 6 in. is suitable for typical passenger car tires ranging from 13 to 16 in. bead diameter and from 6.75 to 9.25 in. maximum width. An arm length of 4.75 in. is a good compromise which will enable a single tool to work with most passenger car tires.

The spacing between arms 12, 14 should be greater than the maximum width of the tire but not so great as to cause interference with the vehicle. The optimum is approximately the maximum width of the tire plus 1.0 in. The spacing of arms 12, 14 can be easily changed by cutting or replacing the resilient member of handle 16.

The angle at the juncture of each arm and the handle and the rigidity of the tool there prevent the handle from being rotatable about its own longitudinal axis, because the tool cannot pass through the polygon formed by the tool, the closest cross chain, and the side chains between them. Such rotation would twist the side chains. This angle should be from 45° to 90°, and, to conform to the profile of most passenger car tires, is preferably about 60°.

The minimum interior width of the tray (i.e., the distance between the interior surfaces of side walls 116, which is the width of tool compartment 144) should be sufficient to allow the tool to fit between them, and thus should be in the range of about 8.0 to 11.0 in. for the passenger car tire sizes mentioned above. These widths are sufficient to prevent the tire from trapping a side chain in a longitudinal channel 138, unless the path of the tire is badly misaligned with the tray. Excess tray width has no disadvantage other than cumbersomeness. The distance between transverse channels 130, 132, 134, 136 should correspond to the distance between the cross chains as measured along a side chain (conventionally 5.0 or 5.25 in.). The length of tool compartment 144, measured as an orthogonal projection of the tool onto the longitudinal axis of the tray, should be the tool arm length plus about 1.0 in. to accommodate handle 16 and angular member 84. Thus, the tool compartment length should be in the range of about 5 to 7 in. for typical passenger car tires. The height of tool compartment 144, measured to from the top of walls 116, 140 to the floor of the compartment at base 112, should be at least the height of tool 10, which is 1.0 in. as shown in the drawings. The depth of tool compartment 144 should be in the range of about 0.75 to 1.5 in.

Construction Details

In the preferred embodiment shown and described, tool 10 is made from 0.125×1.0 in. steel bar, 0.0625×1.0 in. square steel tube, 0.75 in. outside diameter radiator hose, and 0.50 in. plexiglass sheet for rigid platform 166', while tray 110 is made from wood of 0.75 and 1.5 in. thicknesses. In another embodiment of the installation tool a hinged wood handle is used. Switch 150 is made from square metal angle, plexiglass sheet for rigid platform 166, shoe insole material for resilient pad 168, all 0.125 in. thick, and bicycle inner tube for resilient compression band 170 and the sleeve stretched around portions of the angular members. Interior walls 140 are made from metal channel 0.125 in. thick. It will be understood that these materials and other construction details have been described with particularity in order to provide a full disclosure of an operating embodiment of the invention, not to suggest the ultimate refinement of a tool or a tray embodying the principles of the invention. Of course, the tool and tray could be made of other materials, including recycled materials. For production on a commercial scale which would justify substantial capital investment, for example, tool 10 could be made by injection molding a suitable polymeric resin, such as polypropylene or nylon, which may be fiber-reinforced. It may be possible to form the claws and/or hinged handle integrally with the arm members. The tray could also be molded from a similar such resin. It will be further understood that the designs of the tool and tray can and would be expected to be changed to accommodate, and take advantage of, the different materials, while continuing to use the fundamental principles and relationships described herein.

Other Alternative Embodiments

In an alternative embodiment of the installation tool, the outer claws can be similar to the inner claws, but with grooves in the claws shaped to receive either a chain link or the curved, J-shaped end portion of the locking hook, for example flat locking hook 214H; this embodiment facilitates the connection of the fastening elements when the fastening link is being held by the outer claws. In another alternative embodiment of the installation tool, the handle can be offset from the plane of the arms, so that it would appear to be all or part of an inverted "U" in a complete front view of the tool shown in FIG. 1. This would enable the rear of the arms, like the front of the arms, to be disposed along the sidewalls inwardly of the tread, thereby being closer to the free fastening element which will be guided along the inner arm, but at the expense of increasing the height of the tool and hence the tool compartment in the tray. The arms could be curved so they lie along the side chain circle. In an additional alternative embodiment, handle 16 telescopes in two places—between hinge 90 and angular member 46 and between hinge 90 and angular member 84—so that the distance between arms 12, 14 may be reduced while tool 10 is stored in tray 110. This eliminates the width of tool 10 as the factor determining the width of tray 110, as previously described in the discussion of dimensions, in which case the width of tray 110 should be at least the maximum width of the tire.

In an alternative embodiment of the tray, the vehicle supports are shaped to correspond to the spaces between cross chains in a Z or diamond configuration, rather than a ladder configuration, so that the transverse channels are diagonal with respect to the longitudinal channels rather than perpendicular. The cross chains may also have other configurations and may include elements which are not chain links, as shown for example in Zeiser et al U.S. Pat. No. 4,889,172 and Baldry U.S. Pat. No. 4,357,975.

It will be understood that, while presently preferred embodiments of the invention have been illustrated and described, the invention is not limited thereto, but may be otherwise variously embodied within the scope of the following claims.

I claim:

1. A tray for installing, on a tire mounted on a vehicle wheel, an oriented tire chain having side chains and cross chains, by a method in which the arms of a U-shaped installation tool are connected to the ends of the side chain at one end of the tire chain and, with the vehicle stopped with the tire on the tray, the tool is picked up, removed from the tray, and drawn circumferentially around the stationary tire with the chain trailing the tool and sliding over the surface of the tire, which tray comprises:

a base having a longitudinal axis and, at opposite ends of that axis, a rear end and a front, entrance end;

an exterior rear wall and exterior side walls projecting upwardly from the base;

a plurality of vehicle supports projecting upwardly from the base and being spaced from each other and from the side walls so as to define longitudinal channels and transverse channels for receiving and confining laid-out side chains and cross chains, respectively;

a well for receiving side chains and cross chains which have not been laid out;

an interior wall projecting upwardly from the base;

an upwardly facing compartment adjacent the well for receiving the U-shaped tool, protecting the tool from damage due to the weight of the vehicle, and allowing the tool to be grasped and pulled upward to remove it from the tray, which compartment has a bottom defined by the base and a side defined by the interior wall, the interior wall being located between the well and the compartment, so as to keep said chain which has not been laid out contained in the well and thereby prevent it from coming into the compartment during storage or handling of the tray.

2. A tray according to claim 1 wherein the interior wall defining the compartment is sufficiently high to protect the tool from damage by direct contact with the tire and to keep chain in the well from coming over the tool during storage or handling and then damaging the tool by being forced into it by the tire.

3. A tray according to claim 1 wherein the compartment is defined by a plurality of interior walls.

4. A tray according to claim 1 wherein (i) the well is located between the rearmost vehicle support and the rear wall and (ii) the compartment is defined by a plurality of interior walls, the base, the rear wall, and portions of the side walls adjacent to the rear wall.

5. A tray according to claim 1 wherein the side walls have stacking lugs on their top surfaces and stacking recesses on their bottom surfaces directly beneath the stacking lugs.

6. A tray according to claim 1 wherein the interior wall separates the well from a substantial portion of the compartment.

7. A tray according to claim 1 which further comprises a chain element holder having a passage for receiving, locating, and restraining, from lateral movement parallel to the base, a chain element at or near the end of each side chain opposite the end connected to the U-shaped tool.

8. A tray according to claim 1 wherein the compartment is U-shaped.

9. A tray according to claim 1 wherein the interior wall has a height at least as great as the height of the tool, so that the tool does not project above the top of the interior wall when the tire chain is loaded in the tray and the tool is disposed in the compartment.

10. A tray for installing, on a tire mounted on a vehicle wheel, an oriented tire chain having side chains and cross chains, which tray comprises:

- a base having a longitudinal axis and, at opposite ends thereof, a rear end and a front, entrance end;
- a rear wall and side walls projecting upwardly from the base;
- a plurality of vehicle supports projecting upwardly from the base and being spaced from each other and from the side walls so as to define longitudinal channels and transverse channels for receiving and confining laid-out side chains and cross chains, respectively;
- a signal-initiating device comprising a tire-actuated position-indicating switch which initiates a continuing signal when, and only when, the tire is positioned within a zone defined by two predetermined boundaries along the longitudinal axis, so that the device is able to sense and signal the stopped position of the tire as well as the position of the tire while the tire is still moving.

11. A tray according to claim 10 wherein the switch is attached to a vehicle support in such a manner that the switch and the zone are movable parallel to the longitudinal axis.

12. A tray according to claim 11 wherein the switch is located in the frontmost vehicle support.

13. A tray according to claim 12 wherein the frontmost vehicle support is substantially longer than any other vehicle support, in a direction along the longitudinal axis.

14. A tray according to claim 10 wherein the distance between the boundaries defining the zone may be varied by adjusting the switch.

15. A tray according to claim 10 wherein the switch has at least two horizontally spaced surfaces for contacting the tread of the tire, the first of the surfaces being capable of sensing a downward force within the footprint of the tire and the second of the surfaces being capable of sensing an absence of a downward force just outside the footprint.

16. A tray according to claim 15 wherein the spaced surfaces are on a platform rotatable about a horizontal fulcrum in a plane perpendicular to the longitudinal axis.

17. A tray for installing, on a tire mounted on a vehicle wheel, an oriented tire chain having side chains and cross chains, which tray comprises:

- a base having a longitudinal axis and, at opposite ends of that axis, a rear end and a front, entrance end;
- a rear wall and side walls projecting upwardly from the base;
- a plurality of vehicle supports projecting upwardly from the base and being spaced from each other and from the side walls so as to define longitudinal channels and transverse channels for receiving and confining laid-out side chains and cross chains, respectively;
- a well for receiving side chains and cross chains which have not been laid out;
- interior walls defining a compartment adjacent the well for receiving and protecting, from damage due to the weight of the vehicle, a U-shaped tool having spaced arms connected to the ends of the side chains;
- a signal-initiating device comprising a tire-actuated position-indicating switch which initiates a continuing signal when, and only when, the tire is positioned within a zone defined by two predetermined boundaries along the longitudinal axis, so that the device is able to sense and signal the stopped position of the tire as well as the position of the tire while the tire is still moving.

18. A tray according to claim 17 wherein the interior walls defining the compartment are sufficiently high to protect the tool from damage by direct contact with the tire and to keep chain in the well from coming between the tire and the tool during storage or handling and then damaging the tool by indirect contact with the tire.

19. A tray according to claim 17 wherein the well is located between the rearmost vehicle support and the rear wall and the compartment is further defined by the rear wall and portions of the side wall adjacent thereto.

20. A tray according to claim 17 wherein the side walls have a relatively greater height defining the well, and a relatively lesser height near the supports, so as to contain the side chains during storage and handling of the tray yet permit free access to the side chains and unhindered lateral movement thereof during installation of the tire chain, the greater height being at least as great as the height of the supports and the lesser height being less than the height of the supports.

* * * * *